United States Patent [19]

Gabrielsen et al.

[11] Patent Number: 4,499,304

[45] Date of Patent: Feb. 12, 1985

[54] COLOR-FORMING SULFONAMIDODIPHENYLAMINES AND CORRESPONDING SULFONIMIDE DYES

[75] Inventors: Rolf S. Gabrielsen, Webster; Patricia A. Graham, Williamson; James E. Klijanowicz, Pittsford; Max H. Stern, Rochester, all of N.Y.

[73] Assignee: Eastman Kodak Company, Rochester, N.Y.

[21] Appl. No.: 386,457

[22] Filed: Jun. 8, 1982

Related U.S. Application Data

[63] Continuation-in-part of Ser. No. 280,627, Jul. 6, 1981, abandoned.

[51] Int. Cl.$^3$ .................... C07C 143/79; C09B 49/04
[52] U.S. Cl. ...................... 564/92; 260/401; 260/453 RW; 260/397.7 R; 260/505 R; 560/12; 560/13; 560/27; 562/405; 564/49; 564/79; 564/81; 564/82; 564/83; 564/84; 564/99; 8/593
[58] Field of Search ............ 260/401, 397.7, 453 RW; 564/49, 79, 82, 83, 84, 92, 99; 560/12, 13

[56] References Cited

U.S. PATENT DOCUMENTS

| 2,268,353 | 12/1941 | ter Horst | 564/92 X |
|---|---|---|---|
| 2,349,749 | 5/1944 | Paul | 564/92 X |
| 3,284,499 | 11/1966 | Dunbar | 260/556 |
| 3,482,971 | 12/1969 | Bloom et al. | 96/3 |
| 3,755,605 | 8/1973 | Moore et al. | 424/321 |
| 3,938,995 | 2/1976 | Gompf et al. | 96/55 |
| 4,014,647 | 3/1977 | Neeff | 8/174 |
| 4,170,452 | 10/1979 | Grollier et al. | 8/10.2 |
| 4,380,666 | 4/1983 | Gabrielsen et al. | 564/82 |

FOREIGN PATENT DOCUMENTS 111980 9/1964 Czechoslovakia .
856452 12/1960 United Kingdom .

OTHER PUBLICATIONS

Journal of Chem. Soc., 1956, pp. 3814–3820, G. M. K. Hughes et al.
Res. Dis., Dec., 1978, Item No. 17643.

Primary Examiner—Thomas A. Waltz
Attorney, Agent, or Firm—Richard E. Knapp

[57] ABSTRACT

Color-forming para-sulfonamidodiphenylamines and their corresponding sulfonimide dyes are useful in imaging materials. The color-forming sulfonamidodiphenylamines are prepared by condensation reactions. The corresponding sulfonimide dyes are formed by oxidation of the color-forming sulfonamidodiphenylamines by means of a suitable oxidizing agent, such as the oxidized form of a cross-oxidizing silver halide developing agent.

6 Claims, No Drawings

COLOR-FORMING SULFONAMIDODIPHENYLAMINES AND CORRESPONDING SULFONIMIDE DYES

This is a continuation-in-part application of Serial No. 280,627 of R. S. Gabrielsen, P. A. Graham. J. E. Klijanowicz and M. H. Stern, filed July 6, 1981 entitled Color-Forming Sulfonamidodiphenylamines and Corresponding Sulfonimide Dyes, and now abandoned.

BACKGROUND OF THE INVENTION

1. Field of the Invention

This invention relates to color-forming parasulfonamidodiphenylamines and corresponding sulfonimide dyes that are useful in imaging materials, such as photographic silver salt materials, and processes.

2. State of the Art

Photographic materials for producing silver and dye images are well known. The dye image in such materials generally is produced by a coupling reaction in which a developing agent is oxidized upon development of photographic silver halide followed by reaction of the resulting oxidized form of the developing agent with a coupling agent to produce a dye image. This is described in, for example, *Research Disclosure,* December 1978, Item No. 17643, published by Industrial Opportunities, Limited, Homewell, Havant, Hampshire, United Kingdom, and U.S. Pat. No. 3,938,995. It has been desirable to provide alternative means for producing a dye image, especially a dye image that enhances a silver image, other than by a coupling reaction. The art does not disclose that the answer to this problem is found in color-forming para-sulfonamidodiphenylamines and corresponding sulfonimide dyes that do not significantly adversely affect the sensitometric properties of the photographic materials.

Compounds that contain a 2,4-dinitroanilino moiety and are arenesulfonamides are described in U.S. Pat. No. 3,284,499 as pesticides. Also, diphenylamines substituted by haloalkylsulfonamido groups are described as antimicrobial agents, anti-inflammatory agents, analgesics and herbicides. These sulfonamides are not compounds of the present invention. Also, no suggestion is found in the art that these sulfonamides have the properties needed for color formation, such as in photographic silver materials.

The term "photographic material" as used herein means a photographic element and photographic composition. For instance, photographic material herein includes a photographic element and composition comprising a sulfonamidodiphenylamine color-forming agent or a corresponding sulfonimide dye according to the invention.

A continuing need has existing for color-forming sulfonamidodiphenylamines and their corresponding sulfonimide dyes that are useful in imaging materials, especially in photographic silver halide materials.

SUMMARY OF THE INVENTION

It has been found according to the invention that color-forming para-sulfonamidodiphenylamines useful in imaging materials are represented by the formula:

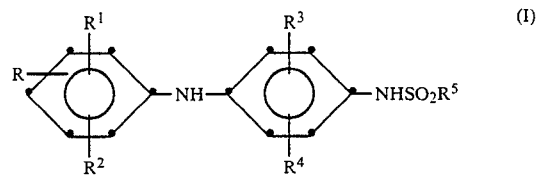

wherein:

R is in the meta or para position and is an electron donating substituent selected from

alkoxy containing 1 to 20 carbon atoms, such as methoxy, ethoxy and hexyloxy, sulfonamido, such as $R^{54}SO_2NH$, aryloxy containing 6 to 20 carbon atoms, such as phenoxy and 2,4-di-t-amylphenoxy, hydrazino and carboxamido groups, such as acetamido, N-methylacetamido and n-octylureido;

$R^1$ is in the ortho or meta position and is hydrogen, alkyl containing 1 to 3 carbon atoms, such as methyl, ethyl and propyl, carboxamido, carbamoyl, alkoxy containing 1 to 3 carbon atoms, such as methoxy, ethoxy and propoxy, sulfonylalkyl containing 1 to 3 carbon atoms ($-SO_2$-alkyl), such as sulfonylmethyl, sulfonylethyl and sulfonylpropyl, sulfonylaryl containing 6 to 12 carbon atoms ($-SO_2$-aryl), such as sulfonylphenyl and tosyl, chlorine, bromine, iodine, fluorine or sulfonamido; when $R^1$ is sulfonamido, $R^1$ is in the meta position;

$R^2$ is hydrogen, alkyl containing 1 to 3 carbon atoms, such as methyl, ethyl and propyl, carbamoyl, alkoxy containing 1 to 3 carbon atoms, such as methoxy, ethoxy and propoxy, sulfonylalkyl containing 1 to 5 carbon atoms, such as sulfonylmethyl, sulfonylethyl, sulfonylpentyl, sulfonylaryl containing 6 to 12 carbon atoms, such as sulfonylphenyl and sulfonylmethylphenyl, chlorine, bromine, iodine or fluorine;

$R^3$ is hydrogen, alkyl containing 1 to 20 carbon atoms, such as methyl, ethyl and propyl, haloalkyl containing 1 to 3 carbon atoms, such as tribromomethyl, tribromoethyl, trichloroethyl, and tribromopropyl, alkoxy containing 1 to 20 carbon atoms, such as methoxy, ethoxy and decyloxy, an ester containing 1 to 20 carbon atoms, such as carboxymethyl, carboxyethyl, carboxyhexyl, carboxyoctyl, and carboxycyclohexyl, carboxy, carboxamido, such as acetamido, N-methylacetamido, and propionamido, chlorine, bromine, iodine, fluorine, carbamoyl, sulfonic acid, sulfamyl, sulfonylalkyl containing 1 to 5 carbon atoms, such as sulfonylmethyl, sulfonylethyl and sulfonylpropyl, sulfonylaryl containing 6 to 12 carbon atoms, such as sulfonylphenyl and tosyl, ureido or a carbocyclic group containing 6 to 12 carbon atoms, such as cyclopentyl, cyclohexyl, and alkyl-substituted cyclohexyl;

$R^4$ is hydrogen, alkyl containing 1 to 20 carbon atoms, trihaloalkyl containing 1 to 3 carbon atoms, such as tribromomethyl, tribromoethyl, trichloroethyl and tribromopropyl, alkoxy containing 1 to 20 carbon atoms, such as methoxy, propoxy, butoxy, and decyloxy, an ester represented by the formula:

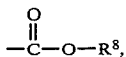

carboxy, carboxamido, chlorine, bromine, iodine, fluorine, carbamoyl, sulfonic acid, sulfamyl, sulfonylalkyl containing 1 to 3 carbon atoms, such as sulfonylmethyl, sulfonylethyl and sulfonylpropyl, ureido, a carbocyclic group containing 5 to 12 carbon atoms, such as cyclopentyl, cyclohexyl and alkyl-substituted cyclohexyl, or the atoms necessary to complete a naphthyl ring with the adjoining phenylene ring, that is, the ring containing $NHSO_2R^5$;

$R^5$ and $R^{5A}$ are individually alkyl containing 1 to 20 carbon atoms, such as methyl, ethyl, propyl, decyl, dodecyl, and benzyl, aryl containing 6 to 20 carbon atoms, such as phenyl, halophenyl, and naphthyl, 2,4,6-triisopropylphenyl and 2,6-diisopropylphenyl;

$R^6$ is hydrogen, alkyl containing 1 to 20 carbon atoms, such as methyl, ethyl, propyl, decyl and dodecyl,

aryl containing 6 to 20 carbon atoms, such as phenyl, naphthyl and tolyl, or represents, with $R^7$, atoms, such as carbon, oxygen, sulfur and nitrogen atoms, completing a heterocyclic group including a 5- or 6-member heterocyclic group such as a pyridino, morpholino or piperidino group;

$R^7$ is hydrogen, alkyl containing 1 to 20 carbon atoms, such as methyl, ethyl, propyl, decyl and dodecyl, carbamoyl, carboxamido, or represents, with $R^6$, atoms such as carbon, oxygen, sulfur and nitrogen atoms, completing a heterocyclic group, including a 5- or 6-member heterocyclic group;

$R^8$ is alkyl containing 1 to 4 carbon atoms, such as methyl, ethyl, propyl and butyl; and, $R^{6A}$ is alkyl containing 1 to 20 carbon atoms, such as ethyl, octyl and decyl.

The para-sulfonamidodiphenylamines according to the invention form corresponding sulfonamide dyes, especially sulfonamide dyes represented by the formula:

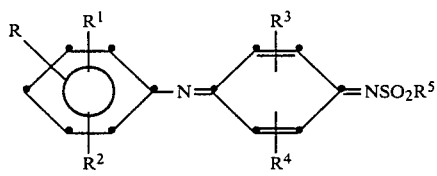

wherein R, $R^1$, $R^2$, $R^3$, $R^4$, $R^5$, $R^6$, $R^7$ and $R^8$ are as defined.

The para-sulfonamidodiphenylamines and the corresponding sulfonamide dyes are useful in imaging materials, such as photographic silver halide materials. For instance, the para-sulfonamidodiphenylamines according to the invention are useful in a photographic silver halide material to form a corresponding sulfonimide dye. The sulfonimide dye according to the invention is generally formed in a photographic material by cross-oxidation of the sulfonamidodiphenylamine by means of a crossoxidizing developing agent. The sulfonimide dye formed is useful as an image dye. Alternatively, the dye formed is useful to enhance a silver image in the photographic material.

The para-sulfonamidodiphenylamines and the corresponding sulfonimide dyes according to the invention are also useful as print out compounds in imaging materials and in printing plates, as image formers in carbonless papers and thermal print papers, and in other applications than photographic materials and processes. Other materials in which the compounds according to the invention are useful include fabrics and fibers, as well as redox indicators.

DETAILED DESCRIPTION OF THE INVENTION

Color-forming para-sulfonamidodiphenylamines within the formula (I) according to the invention are useful in imaging materials. Selection of an optimum color-forming para-sulfonamidodiphenylamine will depend upon such factors as the desired use, the particular sulfonimide dye desired, and particular processing conditions for forming a corresponding sulfonimide dye.

The terms "alkyl" and "aryl" herein mean unsubstituted alkyl and unsubstituted aryl. The terms "alkyl" and "aryl" herein also mean substituted alkyl and substituted aryl wherein the alkyl and aryl are substituted by groups which do not adversely affect the sulfonamidodiphenylamines or the corresponding sulfonimide dyes according to the invention. Examples of suitable substituted alkyl groups include alkyl containing a sulfonamido group, such as $CH_3SO_2NHCH_2CH_2-$, a carboxamido group, an alkoxy group, such as methoxy or ethoxy, carboxyl (—COOH), an aryl group such as a benzyl group, and carbonyl, such as

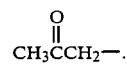

An alkyl group containing an aryl substituent is also known as an aralkyl group. Examples of suitable substituted aryl groups include phenyl containing an alkoxy group, such as methoxy or ethoxy, carboxyl, alkyl, such as methyl, ethyl, propyl and butyl, and hydroxy. An especially useful substituted aryl group is an alkyl-substituted aryl group, such as tolyl, 2,4,6-triisopropylphenyl and t-butylphenyl. An alkyl-substituted aryl group is also known as an alkaryl group. The 2,4,6-triisopropylphenyl group herein is synonomous with a 2,4,6,-triisopropylbenzene group.

The term "para-sulfonamidodiphenylamine" herein alternatively means 4'-sulfonamidodiphenylamine.

An example of a useful class of color-forming para-sulfonamidodiphenylamines is represented by the formula:

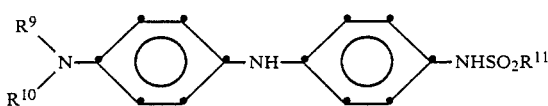

wherein:

$R^9$ is alkyl containing 1 to 20 carbon atoms, such as methyl, ethyl, propyl, decyl and eicosyl;

$R^{10}$ is hydrogen or alkyl containing 1 to 20 carbon atoms, such as methyl, ethyl, propyl, decyl and eicosyl;

$R^{11}$ is alkaryl containing 7 to 20 carbon atoms, such as methylphenyl, butylphenyl and 2,4,6-triisopropylphenyl.

Especially useful para-sulfonamidodiphenylamines and corresponding sulfonimide dyes, such as in imaging materials and processes, are those which comprise a stabilizer group. The term stabilizer group herein means a group that is substituted on the sulfonamidodiphenylamine to provide increased stability to the sulfonamidodiphenylamine and the corresponding sulfonimide dye. A particularly useful stabilizer group is a 2,4,6-triisopropylphenyl group represented by the formula:

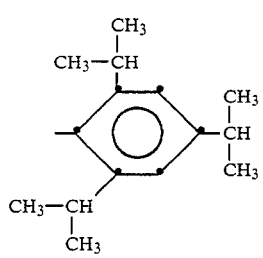

The group is alternatively herein represented by the formula:

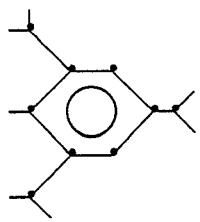

While a 2,4,6-triisopropylphenyl group is a particularly useful stabilizer group, other stabilizer groups are also useful.

Examples of color-forming para-sulfonamidodiphenylamines containing a stabilizer group are those within formula (I) wherein $R^5$ is a 2,4,6-triisopropylphenyl group. Examples of useful corresponding sulfonimide dyes are those within formula (II) wherein $R^5$ is 2,4,6-triisopropylphenyl.

Specific examples of color-forming para-sulfonamiodiphenylamine dye precursors according to the invention containing a stabilizer group are:

4-(N,N-Dihexylamino)-4'-(2,4,6-triisopropylbenzene sulfonamido)diphenylamine represented by the formula:

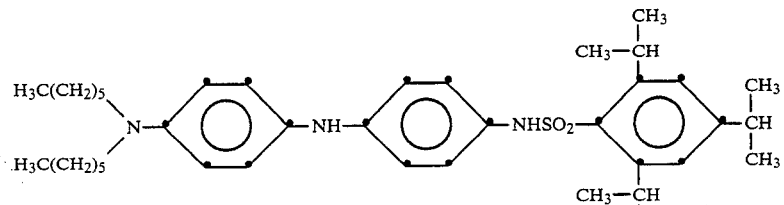

4-n-Hexyloxy-3'-methyl-4'-(2,4,6-triisopropylbenzenesulfonamido)-diphenylamine represented by the formula:

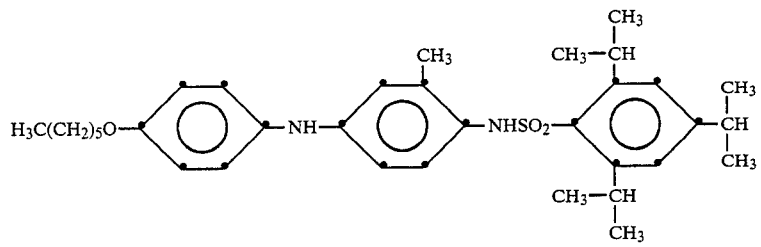

4-(N,N-diethylamino)-4'-(2,4,6-triisopropylbenzenesulfonamido)diphenylamine represented by the formula:

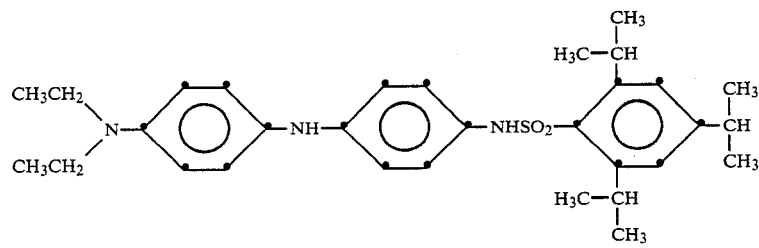

4-(N,N-dimethylamino)-2-phenylsulfonyl-4'-(2,4,6-triisopropylbenzenesulfonamido)diphenylamine represented by the formula:

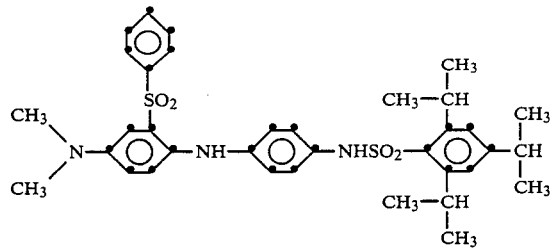

Another class of useful color-forming parasulfonamidodiphenylamines is the class of carboxamido substituted, color-forming para-sulfonamidodiphenylamines represented by the formula:

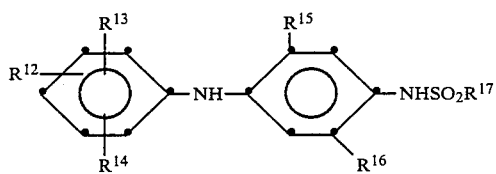

wherein:

$R^{12}$ is in the meta or para position and is an electron donating substituent selected from

alkoxy containing 1 to 20 carbon atoms, such as methoxy, ethoxy, hexyloxy and dodecyloxy, sulfonamido, aryloxy containing 6 to 12 carbon atoms, such as phenoxy and alkyl-substituted phenoxy, and carboxamido groups, such as acetamido, N-methylacetamido and ureido, such as octyl ureido;

$R^{13}$ is in the ortho or meta position and is hydrogen, alkyl containing 1 to 3 carbon atoms, such as methyl, ethyl and propyl, carbamoyl, alkoxy containing 1 to 3 carbon atoms, such as methoxy, ethoxy and propoxy, sulfonylalkyl containing 1 to 5 carbon atoms, such as sulfonylmethyl, sulfonylethyl and sulfonylpentyl, sulfonylaryl containing 6 to 12 carbon atoms, such as sulfonylphenyl and sulfonylmethylphenyl, chlorine, bromine, iodine, fluorine; or, in the meta position is sulfonamido;

$R^{14}$ is hydrogen, alkyl containing 1 to 3 carbon atoms, such as methyl, ethyl or propyl, carbamoyl, alkoxy containing 1 to 3 carbon atoms, such as methoxy, ethoxy and propoxy, sulfonylalkyl containing 1 to 3 carbon atoms, such as sulfonylmethyl, sulfonylethyl and sulfonylpropyl, sulfonylaryl containing 6 to 12 carbon atoms, such as sulfonylphenyl and sulfonyltolyl, chlorine, bromine, iodine or fluorine;

$R^{15}$ is hydrogen or carboxamido, such as acetamido, propionamido, pivalamido and ureido;

$R^{16}$ is hydrogen or carboxamido, such as acetamido, propionamido, butylamido and pivalamido;

$R^{17}$ is alkyl containing 1 to 20 carbon atoms, such as methyl, ethyl, propyl, decyl and eicosyl, aryl containing 6 to 20 carbon atoms, such as phenyl, naphthyl, tolyl and 2,4,6-triisopropylphenyl;

$R^{18}$ is hydrogen or alkyl containing 1 to 20 carbon atoms, such as methyl, ethyl, propyl, decyl and eicosyl; and $R^{19}$ is hydrogen, alkyl containing 1 to 20 carbon atoms, such as methyl, ethyl, propyl, decyl and eicosyl or aryl containing 6 to 12 carbon atoms, such as phenyl and tolyl, wherein when $R^{16}$ is carboxamido, then $R^{15}$ is carboxamido.

The term "sulfonamido" herein means a substituent group represented by the formula:

$$-NHSO_2R^{20}$$

wherein $R^{20}$ is a substituent which does not adversely affect the diphenylamine compound or imide dye according to the invention. $R^{20}$ is, for example, alkyl containing 1 to 20 carbon atoms, such as methyl, ethyl, propyl, butyl, decyl and eicosyl, or aryl containing 6 to 20 carbon atoms, such as phenyl, tolyl, and 2,4,6-triisopropylphenyl. Examples of such groups include 2,4,6-triisopropylphenylsulfonamido, methylsulfonamido and tolylsulfonamido. The term methylsulfonamido herein is synonomous with methanesulfonamido $(CH_3SO_2NH-)$.

An especially useful carboxamido substituted, color-forming para-sulfonamidodiphenylamine is represented by the formula:

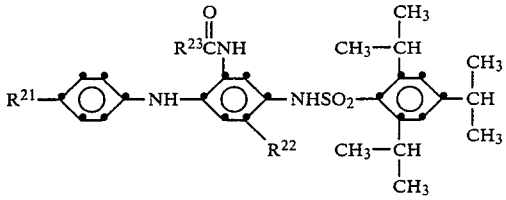

wherein:

$R^{21}$ is alkoxy containing 1 to 20 carbon atoms or

$R^{22}$ is hydrogen or

$R^{23}$ is alkyl containing 1 to 20 carbon atoms, such as methyl, ethyl, propyl, butyl, decyl, dodecyl and eicosyl, aryl containing 6 to 12 carbon atoms, such as phenyl and 2,4-diisopropylphenyl, alkoxy containing 1 to 4 carbon atoms, such as methoxy, ethoxy and butoxy, aryloxy containing 6 to 12 carbon atoms, such as phenoxy and 3,4,5-trimethylphenoxy, or NH-$R^{27}$;

$R^{24}$ is hydrogen or alkyl containing 1 to 20 carbon atoms, such as methyl, ethyl, propyl, decyl and eicosyl;

$R^{25}$ is hydrogen, alkyl containing 1 to 20 carbon atoms, such as methyl, ethyl, propyl, butyl, decyl and eicosyl, or aryl containing 6 to 12 carbon atoms, such as phenyl and 2,4-diisopropylphenyl;

$R^{26}$ is alkyl containing 1 to 20 carbon atoms, such as methyl, ethyl, propyl, decyl and eicosyl, cycloalkyl containing 5 to 20 carbon atoms, such as cyclopentyl, cyclohexyl and substituted cyclohexyl, or aryl containing 6 to 12 carbon atoms, such as phenyl and tolyl, alkoxy containing 1 to 4 carbon atoms, such as methoxy, ethoxy and butoxy, aryloxy containing 6 to 12 carbon atoms, such as phenoxy and 3,4,5-trimethylphenoxy, or NH-$R^{28}$;

$R^{27}$ is alkyl containing 1 to 20 carbon atoms, such as methyl, ethyl, propyl, butyl, decyl and eicosyl, aryl containing 6 to 12 carbon atoms, such as phenyl and tolyl, alkoxy containing 1 to 4 carbon atoms, such as methoxy, ethoxy and butoxy, or aryloxy containing 6 to 12 carbon atoms, such as phenoxy and 2,4,5-trimethylphenoxy; and, $R^{28}$ is alkyl containing 1 to 20 carbon atoms, aryl containing 6 to 12 carbon atoms, such as phenyl and 2,4-dimethylphenyl, alkoxy containing 1 to 4 carbon atoms, such as methoxy, ethoxy, propoxy and butoxy, or aryloxy containing 6 to 12 carbon atoms, such as phenoxy and 3,4,5-trimethylphenoxy.

Examples of further useful carboxamido substituted color-forming para-sulfonamidodiphenylamines are:

4-[N-ethyl-N-(β-methanesulfonamidoethyl)amino]-2-methyl-2',5'-dipivalamido-4'-(2,4,6-triisopropylbenzenesulfonamido)diphenylamine represented by the formula:

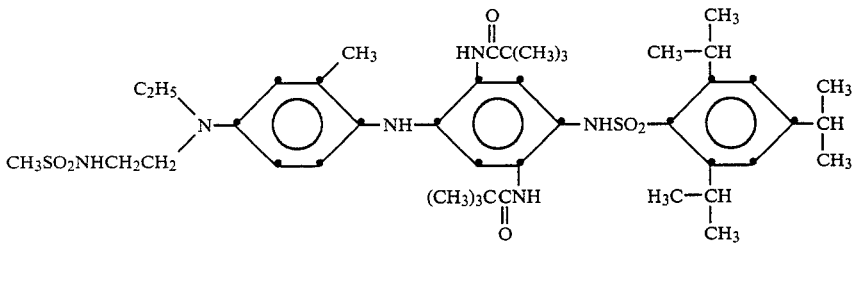

4-n-Hexyloxy-2',5'-dipivalamido-4'-(2,4,6-triisopropylbenzenesulfonamido)diphenylamine represented by the formula:

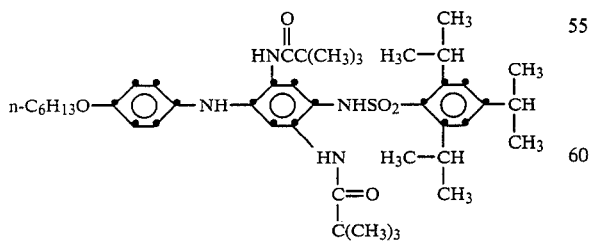

Other color-forming para-sulfonamidodiphenylamine compounds containing a carboxamido group and at least two sulfonamido groups are represented by the formula:

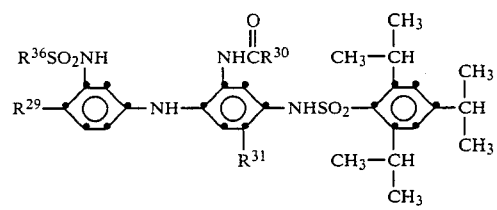

wherein:

$R^{29}$ is alkyl containing 1 to 20 carbon atoms, such as methyl, ethyl, propyl, decyl and eicosyl, alkoxy containing 1 to 20 carbon atoms, such as methoxy, ethoxy, hexyloxy and dodecyloxy, or

$R^{30}$ is alkyl containing 1 to 20 carbon atoms, such as methyl, ethyl, propyl, butyl, decyl and eicosyl, aryl containing 6 to 12 carbon atoms, such as phenyl and 2,4-dimethylphenyl, alkoxy containing 1 to 4 carbon atoms, such as methoxy, ethoxy, propoxy and butoxy, aryloxy containing 6 to 12 carbon atoms, such as phenoxy and 3,4,5-trimethylphenyl or NH-$R^{34}$;

$R^{31}$ is hydrogen or

$R^{32}$ is hydrogen or alkyl containing 1 to 20 carbon atoms, such as methyl, ethyl, propyl, decyl and eicosyl;

$R^{33}$ is hydrogen, alkyl containing 1 to 20 carbon atoms, such as methyl, ethyl, propyl, decyl and eicosyl, or aryl containing 6 to 12 carbon atoms, such as phenyl and 2,4-dimethylphenyl;

$R^{34}$ is alkyl containing 1 to 20 carbon atoms, aryl containing 6 to 12 carbon atoms, such as phenyl and 2,4-dimethylphenyl, alkoxy containing 1 to 4 carbon atoms, such as methoxy, ethoxy and propoxy, or aryloxy containing 6 to 12 carbon atoms, such as phenoxy and 3,4,5-trimethylphenoxy;

$R^{35}$ is alkyl containing 1 to 20 carbon atoms, such as methyl, ethyl, propyl, decyl and eicosyl, aryl containing 6 to 12 carbon atoms, such as phenyl and 2,4-dimethylphenyl, alkoxy containing 1 to 4 carbon atoms, such as methoxy, ethoxy and butoxy, or aryloxy containing 6 to 12 carbon atoms, such as phenoxy and 3,4,5-trimethylphenoxy; and $R^{36}$ is alkyl containing 1 to 12 carbon atoms, such as methyl, ethyl, propyl and decyl.

Examples of such color-forming para-sulfonamidodiphenylamines containing a carboxamido group and at least two sulfonamido groups include:

3-Methanesulfonamido-4-methyl-2′-palmitamido-4′-(2,4,6-triisopropylbenzenesulfonamido)diphenylamine represented by the formula:

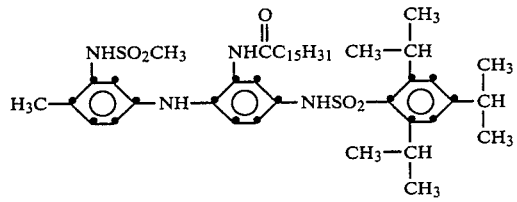

3-Methanesulfonamido-4-methoxy-2′-pivalamido-4′-(2,4,6-triisopropylbenzenesulfonamido)diphenylamine represented by the formula:

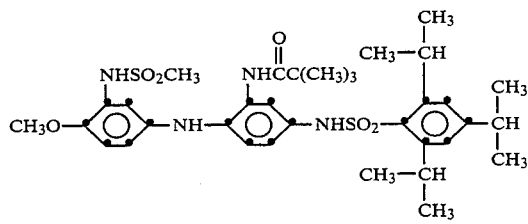

The color-forming para-sulfonamidodiphenylamines according to the invention are prepared by at least one of the following four methods:

1. The first method comprises condensation of a phenylenediamine or ether substituted aniline with a substituted halonitrobenzene followed by reduction of the nitro group and subsequent sulfonylation of the amine. This is illustrated by the following synthesis:

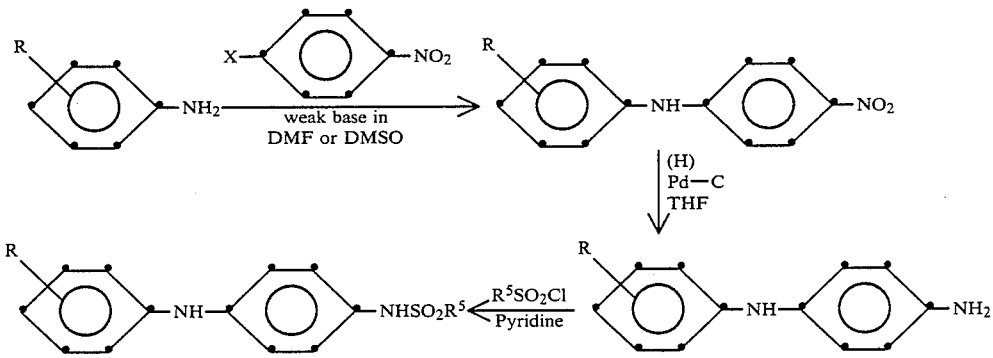

X represents halogen, such as bromine, chlorine or fluorine, and R and $R^5$ are as defined. DMF herein means dimethylformamide. DMSO herein means dimethylsulfoxide. THF herein means tetrahydrofuran. Pd-C herein means a palladium-charcoal catalyst suitable for catalyzing hydrogen reduction of a nitro group.

2. The second method comprises condensation of a halonitroaniline with a sulfonyl chloride, followed by condensation with a phenylenediamine or aniline; and, then reduction of the nitro group, followed by acylation of the amine to yield a carboxamido-substituted sulfonamidodiphenylamine. The sulfonylation step is avoidable by using a halonitrosulfonamidobenzene that condenses directly with the phenylenediamine or aniline. The second method is illustrated by the following synthesis:

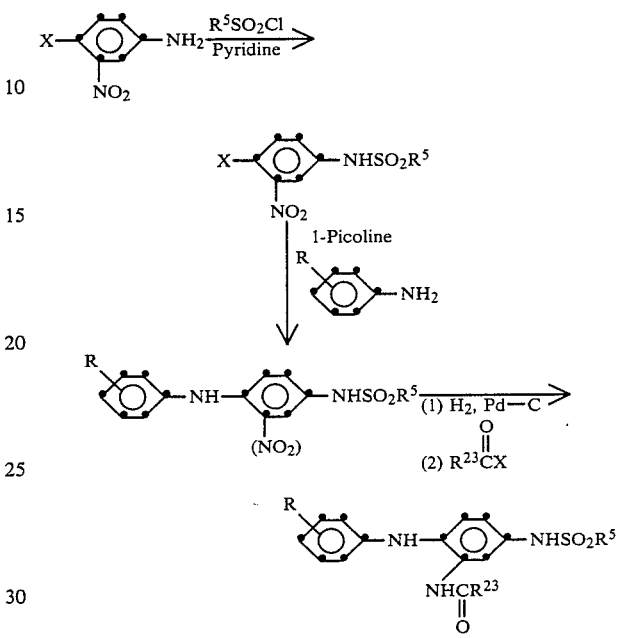

wherein X, R, $R^5$ and $R^{23}$ are as defined.

3. The third method comprises condensation of a substituted aniline with a sulfonyl chloride followed by oxidative coupling with a phenylenediamine in the presence of ferricyanide and base to yield a dye that is subsequently reduced to its leuco state. Carboxamido groups are introduced prior to oxidative coupling. The third method is illustrated by the following synthesis:

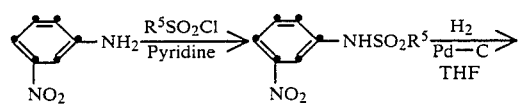

-continued

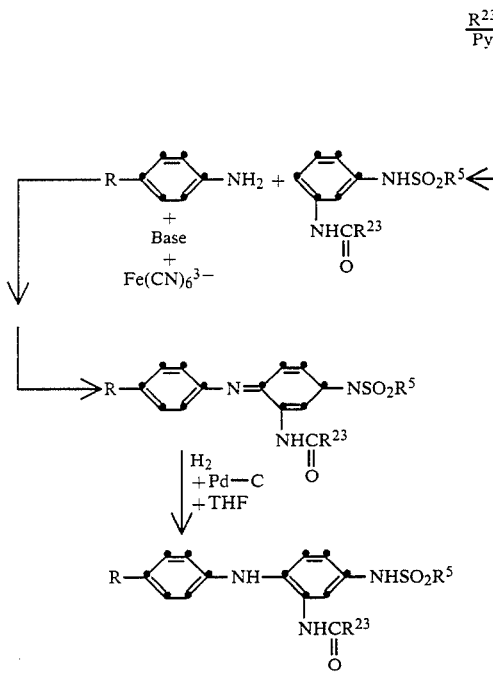

wherein R, $R^5$ and $R^{23}$ are as defined.

4. The fourth method comprises a Smiles rearrangement method for those preparations in which direct nucleophilic condensation is not satisfactory. The Smiles rearrangement is applicable to weakly basic anilines or ortho-sterically hindered anilines that are not satisfactorily condensable with 1-halo-4-nitrobenzenes by direct nucleophilic condensation. This is illustrated by the following synthesis:

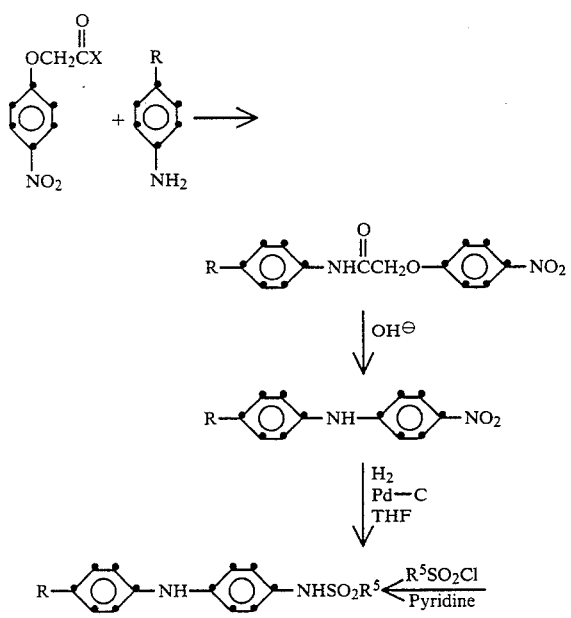

wherein R and $R^5$ are as defined.

Examples of compounds that are preferably prepared by the fourth method are:

4-(N,N-Dimethylamino)-2-phenylsulfonyl-4'-(2,4,6-triisopropylbenzenesulfonamido)diphenylamine represented by the formula:

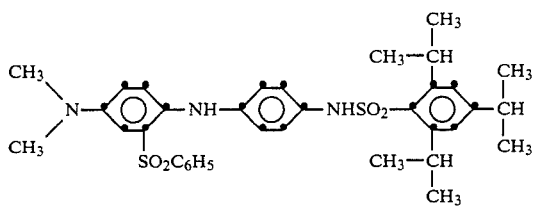

4-(N,N-Diethylamino)-2-methyl-3'-methyl-4'-(2,4,6-triisopropylbenzenesulfonamido)diphenylamine represented by the formula:

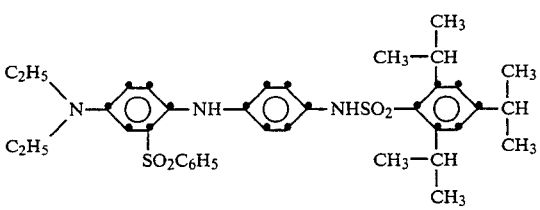

The optimum reaction conditions and concentrations of reactants in methods 1, 2, 3 and 4 will depend upon such factors as the particular para-sulfonamidodiphenylamine to be prepared and the particular reactants.

The color-forming sulfonamidodiphenylamines and their corresponding sulfonimide dyes are shown in their non-salt form. The color-forming sulfonamidodiphenylamines and their corresponding dyes herein include either of the appropriate forms. Examples of suitable salts of the described para-sulfonamidodiphenylamines include para-toluenesulfonate, 1,5-naphthalene disulfonate and benzenesulfonate.

The para-sulfonamidodiphenylamines are useful in a photographic material in a range of concentrations. Selection of an optimum concentration of para-sulfonamidodiphenylamine will depend upon such factors as the desired image, the particular photographic material, processing steps and conditions, other components in the photographic material, and particular para-sulfonamidodiphenylamine. A useful concentration of para-sulfonamidodiphenylamine is within the range of about 0.08 to about 0.6 mole of para-sulfonamidodiphenylamine per mole of silver halide in the photographic material. An especially useful concentration is within the range of about 0.1 to about 0.2 mole of para-sulfonamidodiphenylamine, as described, per mole of silver halide in the described photographic material. In a silver halide photographic element, a useful concentration of para-sulfonamidodiphenylamine is within the range of about 0.5 to about 22 mg of para-sulfonamidodiphenylamine per square decimeter of support, such as a concentration within the range of about 5 to about 11 mg per square decimeter of support.

The hues of the dyes produced from the color-forming para-sulfonamidodiphenylamines vary, depending on such factors as the particular groups on the color-forming agents, processing conditions and other components in a photographic material containing the para-sulfonamidodiphenylamines, such as dispersion solvents. In a photographic material, a para-sulfonamidodiphenylamine is generally colorless or very slightly colored prior to processing. Some of the suitable para-sulfonamidodiphenylamine color-forming agents have a slight yellow color in the photographic material. This slight color is not considered unacceptable.

The term "colorless" herein means that the para-sulfonamidodiphenylamine color-forming agent in a photographic material does not absorb radiation to an undesired degree in the visible region of the electromagnetic spectrum. In some photographic materials, the para-sulfonamidodiphenylamine absorbs radiation in certain areas of the electromagnetic spectrum which do not adversely affect the described properties or the desired image formed upon processing.

Alternatively, the color-forming para-sulfonamidodiphenylamine according to the invention absorbs electromagnetic radiation outside the visible region of the electromagnetic spectrum before imagewise exposure and processing of a photographic material containing the para-sulfonamidodiphenylamine. The nature of the absorption and degree of absorption of the para-sulfonamidodiphenylamine depends upon the nature of the substituent groups on the para-sulfonamidodiphenylamine nucleus.

Color-forming para-sulfonamidodiphenylamines according to the invention are especially useful in a photographic material comprising a photosensitive component which consists essentially of photographic silver halide. Many photographic silver halides are useful in the photographic material. Examples of useful photographic silver halides are silver chloride, silver bromide, silver bromoiodide, silver chlorobromoiodide, silver iodide or mixtures thereof. The photographic silver halide is generally present in the photographic material in the form of an emulsion which is a dispersion of the photographic silver halide in a suitable binder. The photographic silver halide is present in a range of grain sizes from fine grain to coarse grain. A composition containing the photographic silver halide is prepared by any of the well-known procedures in the photographic art, such as described in *Research Disclosure*, December 1978, Item No. 17643. The photographic silver halide composition is generally chemically sensitized.

The silver halide is spectrally sensitized with spectral sensitizing dyes as described in, for example, the above *Research Disclosure*, December 1978, Item No. 17643, including dyes from a variety of classes, such as polymethine dyes which include the cyanines, merocyanines, complex cyanines and merocyanines (including tri, tetra and polynuclear cyanines and merocyanines), as well as oxonols, hemioxonols, styryls, merostyryls and streptocyanines. Combinations of spectral sensitizing dyes are useful.

The color-forming para-sulfonamidodiphenylamines are useful in any suitable location in the photographic material which produces the desired dye upon processing. The para-sulfonamidodiphenylamine should be in a location with respect to the photosensitive silver halide which produces the desired dye image and the desired silver image upon processing. The para-sulfonamidodiphenylamine is preferably in a location with respect to the photographic silver halide that produces a dye enhanced silver image upon appropriate processing. Alternatively, a proportion of the sulfonamidodiphenylamine is in a layer contiguous to the layer of the photographic element comprising photosensitive silver halide. The term "in reactive association" herein means that the photosensitive silver halide and the described para-sulfonamidodiphenylamine color-forming agent are in a location with respect to each other which enables the photographic material upon processing to produce a desired dye image and a desired silver image.

A para-sulfonamidodiphenylamine according to the invention forms a sulfonimide dye by reaction with a suitable oxidizing agent. Suitable oxidizing agents include potassium ferricyanide, potassium dichromate or permanganate, organic peroxides, inorganic peroxides and the oxidized form of a silver halide developing agent, such as the oxidized form of a 3-pyrazolidone developing agent. Oxidation of the para-sulfonamidodiphenylamine preferably is carried out in a photographic silver halide material. However, oxidation of the para-sulfonamidodiphenylamine is also suitable in other environments, such as in clinical chemistry environments in which suitable oxidizing agents are present and in imaging materials in the graphic arts and carbonless copy papers.

Many developing agents are useful for developing an image in a photographic material containing a color-forming para-sulfonamidodiphenylamine. Any silver halide developing composition is useful, provided it comprises a cross-oxidizing developing agent which will cross-oxidize with the sulfonamidodiphenylamine. Such a silver halide developer, called a cross-oxidizing developing agent herein, becomes oxidized during development by reducing exposed silver halide to silver metal. The oxidized developer then cross-oxidizes the sulfonamidodiphenylamine.

A cross-oxidizing developing agent (COD) enables the sulfonamidodiphenylamine to become oxidized in a photographic material without the sulfonamidodiphenylamine itself developing silver. It is viewed as an electron transfer agent which shuttles electrons between the developing silver halide and the sulfonamidodiphenylamine.

The requirements for a cross-oxidizing developing agent generally are:
(a) it must have sufficient electrochemical potential under the conditions of use to develop exposed silver halide;
(b) in its oxidized form, it must be of such electrochemical potential as to oxidize the sulfonamidodiphenylamine; and
(c) in its oxidized form, it must be stable to decomposition by other chemical reactions long enough to undergo the redox reaction with the sulfonamidodiphenylamine.

If any of the conditions (a), (b) or (c) are not met, the developing agent is not a cross-oxidizing developing agent. This is to say, whether a developing agent is cross-oxidizing or not depends upon whether the oxidized form is sufficiently stable and of an oxidizing potential such that an effective transferral of electrons can occur during cross-oxidizing development.

Whether a particular developing agent meets the requirements of a cross-oxidizing developing agent, as described, depends upon the conditions under which development occurs. Other components in the developing composition, the pH of the developing composition, the temperature of the development process and the length of development time all effect whether the requirements for a cross-oxidizing developing agent are met. Any developing agent which meets the requirements of a cross-oxidizing developing agent under development conditions is useful. Examples of developing agents which are useful as cross-oxidizing developing agents and are also preferred include 1-phenyl-3-pyrazolidone, 1-phenyl-4,4-dimethyl-3-pyrazolidone and 4-hydroxymethyl-4-methyl-1-phenyl-3-pyrazolidone. Such cross-oxidizing developing agents are described in, for example, U.S. Pat. No. 3,938,995. Combinations of developing agents are useful, if desired. Combinations of non-cross-oxidizing developing agents and cross-oxidizing developing agents are useful, provided a minor proportion, generally up to 10 percent by weight, of the non-cross-oxidizing developing agent is present. Examples of combinations of a non-cross-oxidizing developing agent and cross-oxidizing agents include 4-hydroxymethyl-4-methyl-1-phenyl-3-pyrazolidone with a minor proportion of at least one of the non-cross-oxidizing developing agents, such as ascorbic acid, hydroquinone or a pyrimidine. Selection of an optimum silver halide developing agent or developing agent combination will depend upon the described factors, including the desired image, the particular photosensitive silver halide, processing conditions and the like.

It is useful to incorporate a silver halide developing agent or silver halide developing agent combination in the photographic material. Typically, however, the developing agent is most useful in a processing solution in which the described photographic material is processed to produce a desired dye image and silver image.

The term "developing agent" herein includes compounds which are developing agents and developing agent precursors. That is, those compounds are included which are not developing agents in the photographic material until a condition occurs, such as contact with a suitable activator of the photographic material.

The tone of the combined silver image and dye image produced in a photographic material will vary, depending upon such factors as the silver morphology of the developing silver image, the covering power of the silver materials, the particular dye or dye combination formed, the particular developing agent, processing conditions and the like. In photographic materials according to the invention that provide a brown silver image, a dye produced from the described color-forming agent is especially useful which is complimentary in hue to the silver image.

The photographic materials comprise a variety of binders, alone or in combination. The described binders include both naturally occurring substances such as proteins, for example, gelatin, gelatin derivatives, cellulose derivatives, polysaccharides such as dextran, gum arabic and the like; and synthetic polymeric materials, such as water soluble polyvinyl compounds like poly(vinyl pyrrolidone) and acrylamide polymers.

If desired, the described photographic elements contain an overcoat layer and/or inner layer and/or subbing layer to provide desired properties. The overcoat layer, for example, increases resistance to abrasion and other markings on the element. The overcoat layer, inner layer or subbing layer contain, alone or in combination, the described vehicles or binders. Gelatin is an especially useful binder.

The photographic element comprises a variety of supports. Useful supports include those which are resistant to adverse changes in structure due to processing conditions and which do not adversely affect the desired sensitometric properties of the photographic materials. Typical supports include cellulose ester, poly(vinyl acetal), poly(ethylene terephthalate) and polycarbonate films, as well as related films and resinous materials. Glass, paper, metal and the like supports are also useful. Typically, a flexible support is most useful.

In preparing a composition comprising a color-forming para-sulfonamidodiphenylamine, a dispersion solvent, also called a coupler solvent, is useful to produce a coating composition. Any suitable coupler solvent known in the photographic art is useful for aiding dispersion of the sulfonamidodiphenylamine compound. Examples of useful coupler solvents include N-n-butylacetanilide, diethyl lauramide, di-n-butyl phthalate and 2,4-di-tert amylphenol. The sulfonamidodiphenylamine is also loaded into a latex, or a non-solvent dispersion is prepared, if desired.

Other addenda known to be useful in the photographic art are also useful in the photographic materials. These addenda include, for instance, brighteners, antifoggants and stabilizers, light absorbing and scattering materials, hardeners, coating aids, plasticizers, lubricants, antistatic materials and matting agents. These addenda are also described in *Research Disclosure*, December 1978, Item No. 17643.

Photographic materials containing color-forming para-sulfonamidodiphenylamines are coated on a suitable support by procedures known to be useful in the coating of photographic layers in the photographic art. Such procedures include, for example, immersion or dip-coating, roller coating, reverse roll coating, airknife coating, doctor blade coating, spray coating, extrusion coating, bead coating, stretch-flow coating and curtain coating.

The photographic elements are imagewise exposed by means of various forms of energy. Such forms of energy include those to which the photosensitive silver halide is sensitive and encompass the ultraviolet, visible and infrared regions of the electromagnetic spectrum, as well as electron beam and beta radiation, gamma ray, X-ray, alpha particle, neutron radiation and other forms of corpuscular wave-like radiant energy in either non-coherent (random phase) forms or coherent (in phase) forms as produced by lasers. Exposures are monochromatic, orthochromatic or panchromatic, depending upon the spectral sensitization of the photosensitive silver halide. Imagewise exposure is generally for a sufficient time and intensity to produce a developable latent image in the photographic element.

The described photographic elements are processed either in a process which produces a positive dye image or in a process which produces a negative dye image and silver image in the photographic element. The light sensitive silver halide contained in the photographic element, as described, is processed following exposure to form a visible image by reactively associating the silver halide with an aqueous alkaline medium in the presence of a developing agent contained in the medium or the element.

If a reversal dye image is desired in the photographic element, a process is most useful in which the latent image in the exposed element is developed by means of a non-cross-oxidizing developing composition as a first development step. During this step, the exposed silver halide is reduced to elemental silver by the non-crossoxidizing developing composition. The non-cross-oxidizing developing composition does not, when oxidized, oxidize the sulfonamidodiphenylamine to its corresponding dye.

The non-cross-oxidizing compositions useful in this step are generally alkaline solutions comprising a non-cross-oxidizing developing agent. Non-cross-oxidizing developing agents are well known in the photographic art and include many silver halide developing agents which will reduce exposed silver halide to silver, but will not oxidize the para-sulfonamidodiphenylamine to a corresponding dye.

In a second step of the process for forming a reversal dye image, fogging is accomplished by exposing the photographic element to light or by chemical fogging by means of fogging compositions known in the photographic art. This fogging does not adversely affect the color-forming para-sulfonamidodiphenylamine.

Following the described fogging step, a second silver halide developing step is carried out. This is carried out by means of a cross-oxidizing developing composition. It is in this step that the dye image is formed. Any silver halide developing composition is useful in this step, provided it cross-oxidizes the para-sulfonamidodiphenylamine to a desired dye. Such silver halide developing compositions include an alkaline solution comprising a cross-oxidizing silver halide developing agent. This cross-oxidizing developing agent becomes oxidized during development by reducing exposed or fogged silver halide to silver metal. The oxidized developer then cross-oxidizes the para-sulfonamidodiphenylamine to produce a desired dye which contains an amount of dye in inverse proportion to the amount of exposure of the photographic element. That is, a positive dye image, also called a reversal dye image, is formed.

An example of a process for using a color-forming compound according to the invention is a process of producing a positive dye image in an imagewise exposed photographic element comprising a support having thereon, in reactive association, in a gelatino binder: (a) photosensitive silver halide gelatino emulsion, and (b) a sulfonamidodiphenylamine color-forming agent consisting essentially of 4-(N,N-dihexylamino)-4'-(2,4,6-triisopropylbenzenesulfonamido)diphenylamine. This process comprises (A) developing the photographic element in an alkaline photographic developer in the absence of a cross-oxidizing, silver halide developing agent, and then (B) uniformly exposing the resulting element to a flash exposure of light, followed by (C) developing the photographic element in an alkaline cross-oxidizing developer comprising an aqueous alkaline solution of 4-methyl-4-hydroxymethyl-1-phenyl-3-pyrazolidone, and (D) bleaching and fixing the photographic element in a silver halide bleaching and fixing solution to produce a positive dye image in the photographic element. It is especially useful to treat the photographic element by means of a development stop bath after step (A) and before step (B).

An advantage of the color-forming para-sulfonamidodiphenylamines according to the invention is that the sulfonimide dye images produced upon processing exhibit a desired degree of stability to post-processing conditions and visible light exposure. A simple test is useful for establishing the degree of stability which is desired for a dye image produced from a para-sulfonamidodiphenylamine color-forming agent according to the invention. One such test is a test well known in the photographic art in which the processed photographic element is exposed to a Simulated Average North American Skylight (SANS) with continuous 5400 LUX of exposure at an average temperature of 21° C. at 45 percent relative humidity. A comparison of the stability of the tested dye to a control in this test provides an indication of the degree of stability of the dye.

In one embodiment of the invention, the described photographic material comprises a silver halide developing agent. When a silver halide developing agent is present in the described photographic material, a developed image is produced after imagewise exposure of the photographic material by contacting the element with an alkaline activator solution which enables development of the exposed silver halide, as well as production of the desired dye.

Many alkaline activators are useful for developing an image in a photographic element as described comprising an incorporated silver halide developing agent. Any of the alkaline activators commonly used in the photographic art, such as in stabilization processing, are useful for developing an image in the described photographic element. Examples of useful alkaline activators include sodium hydroxide, potassium hydroxide, trisodium phosphate·12H$_2$O (pH 12), sodium metaborate (pH 12), disodium phosphate and monosodium phosphate. The optimum alkaline activator will depend upon such factors as the desired image, the particular developing agent, processing conditions and the like. An especially useful alkaline activator comprises trisodium phosphate (pH 12).

The alkaline activator is useful in a range of concentrations. A useful concentration of alkaline activator is within the range of about 10 to about 50 grams per liter of activator solution which produces a pH within the range of about 11 to about 12.

An optimum concentration of alkaline activator will depend upon such factors as the particular activator, the desired image, processing conditions, particular photosensitive silver halide and the like.

The following examples are included for a further understanding of the invention.

EXAMPLE 1

Preparation of 4-(N,N-dihexylamino)-4'-benzenesulfonamidodiphenylamine

A sample of N,N-dihexyl-p-phenylenediamine-di-p-toluenesulfonic acid salt (30.8 grams, 0.05 mole) in DMF (150 ml) was stirred under a nitrogen atmosphere. Successive additions of sodium bicarbonate (16.8 grams) and p-fluoronitrobenzene (7.05 grams, 0.05 moles) were made to the mixture. After stirring the mixture overnight at 90° to 100° C., the reaction mixture was poured into ice water and extracted with ethyl acetate. The extract was washed with water, dried and freed of solvent. The filtrate residue was chromatographed from Woelm's silica gel using benzene as eluent to provide 4-dihexylamino-4'-nitrodiphenylamine as a red oil (12.4 grams). This intermediate was characterized by nuclear magnetic resonance.

This nitro intermediate was reduced to the corresponding amine as described in the following example and converted to the crude benzenesulfonamidodiphenylamine (17 grams, dark grey oil). This was purified by chromatography from Woelm's silica gel using chloroform as eluent. The filtrate residue was recrystallized from a mixture of methanol and hexane to provide tan leaflets (4.7 grams) comprising 4-dihexylamino-4'-benzenesulfonamidodiphenylamine having a melting point of 108° to 112° C. The desired product was identified by conventional analytical techniques.

EXAMPLE 2

Preparation of
4-(N,N-diethylamino)-4'-benzenesulfonamidodiphenylamine

A solution of N,N-diethyl-p-phenylenediamine (16.4 grams, 0.10 mole) and p-fluoronitrobenzene (14.1 grams, 0.10 mole) in 200 ml of dimethylformamide (DMF) was stirred overnight with sodium bicarbonate (16.8 grams, 0.20 mole) at 85° to 90° C. under a nitrogen atmosphere. This reaction mixture was poured into ice water and extracted with ethyl acetate. Evaporation of the solvent provided 4-diethylamino-4'-nitrodiphenylamine. This product was recrystallized from methanol to provide 6.2 grams of red-violet leaflets having a melting point of 139° to 141° C. This product was identified by conventional analytical techniques.

The nitro intermediate (5.7 grams) in tetrahydrofuran (100 ml) was hydrogenated over palladium-charcoal catalyst (1.2 grams) in a Parr apparatus at 40 psi. The corresponding amine was converted to its benzenesulfonimidodiphenylamine by means of benzenesulfonyl chloride. Recrystallization from methanol yielded a gray solid (3.58 grams) having a melting point of 145° to 146° C. This compound was characterized by nuclear magnetic resonance and other conventional analytical techniques.

EXAMPLE 3

Preparation of
4-methoxy-4'-benzenesulfonamidodiphenylamine

A solution of p-anisidine (49.2 grams, 0.4 mole) and p-fluoronitrobenzene (28.2 grams, 0.2 mole) in dimethylsulfoxide was stirred for 24 hours on a steam bath. The red reaction mixture was poured into water (500 ml) and extracted with ethyl acetate. The extract was washed with water and then dried over anhydrous magnesium sulfate. It was then evaporated to dryness. The residue was slurried in ligroin and filtered to provide a brickred solid. This was dissolved in ethyl acetate, warmed with charcoal, and the filtrate filtered through a filtering composition. The filtrate was evaporated and the residue recrystallized from ethyl acetate to provide 4-methoxy-4'-nitrodiphenylamine (28 grams) having a melting point of 149° to 151° C. as a bright-orange needle composition. This intermediate was identified by conventional chemical analytical techniques.

A solution of the above nitro compound intermediate (24.4 grams, 0.1 mole) in ethyl acetate (250 ml) was converted to the corresponding amine by hydrogenation over 5 percent palladium-charcoal catalyst (1.5 grams) at 60 psi. After filtration, the solvent was removed under vacuum and the light-purple solid dissolved in pyridine (150 ml). This was reacted with benezenesulfonyl chloride (17.7 grams, 0.1 mole) by stirring for 3 hours under a nitrogen atmosphere at 25° C. After dilution with water (500 ml), the organic phase was washed with water and then dried over magnesium sulfate and freed of solvent. The red oil resulting was dissolved in chloroform and filtered through 75 grams of a filtering composition (Florisil). The filtrate residue was recrystallized three times from chloroform-ligroin to provide a white powder (12 grams) having a melting point of 133° to 135° C. This desired product was identified by conventional chemical analytical techniques.

EXAMPLE 4

Preparation of
4-(N,N-dihexylamino)-4'-(2,4,6-triisopropylbenzenesulfonamido)diphenylamine A sample (5.24 grams, 0.013 mole) of 4-dihexylamino-4'-nitrodiphenylamine (prepared as in Example 1) was reduced in a Parr apparatus (40 psi) in dry tetrahydrofuran (100 ml) containing palladium-charcoal catalyst (1.2 grams). The filtrate was freed of solvent under vacuum and the resulting 4'-amino derivative dissolved in dry pyridine (25 ml) and reacted at 5° C. with 2,4,6-triisopropylbenzenesulfonyl chloride (4.5 grams, 0.015 mole). After stirring for three hours at 25° C., the reaction mixture was poured into chloroform (200 ml) and ice water. The organic phase was washed five times with water, dried, concentrated to about 50 ml and chromatographed on Woelm's silica gel. The chloroform eluate was freed of solvent and the filtrate residue recrystallized from methanol. The crystalline product was washed with a methanol and water composition (10:1 parts by volume), dried and characterized by nuclear magnetic resonance and elemental analysis. The desired product (4.85 grams) had a melting point of 127° to 129° C.

EXAMPLE 5

Preparation of
4-(N,N-diethylamino)-4'-(2,4,6-triisopropylbenzenesulfonamido)diphenylamine A solution of N,N-diethyl-p-phenylenediamine (16.4 grams, 0.10 mole) and p-fluoronitrobenzene (14.1 grams, 0.10 mole) in 200 ml of dimethylformamide was stirred overnight with sodium bicarbonate (16.8 grams, 0.20 mole) at 85° to 90° C. under a nitrogen atmosphere. This reaction mixture was poured into ice water and extracted with ethyl acetate. Evaporation of the solvent provided 4-diethylamino-4'-nitrodiphenylamine which was recrystallized from methanol to provide red-violet leaflets (6.2 grams) having a melting point of 139° to 141° C. The desired product was also identified by elemental analysis.

A sample of the intermediate product was reduced to provide 0.015 mole of 4-diethylamino-4'-aminodiphenylamine which was then dissolved in dry pyridine (25 ml) at 5° C. under a nitrogen atmosphere and reacted with 2,4,6-triisopropylbenzenesulfonyl chloride (4.52 grams, 0.015 mole). The corresponding triisopropylbenzenesulfonamide was purified by chromatography from Woelm's silica gel, using chloroform as an eluent. The product was recrystallized from aqueous methanol. A grayish-tan solid (2.9 grams) was produced having a melting point of 152° to 154° C. The desired product was also identified by elemental analysis.

EXAMPLE 6

Preparation of
4-hexyloxy-3'-methyl-4'-(2,4,6-triisopropylbenzenesulfonamido)diphenylamine A solution of p-hexyloxyaniline (15 grams, 0.08 mole) and 5-fluoro-2-nitrotoluene (6.4 grams, 0.04 mole) in dimethylsulfoxide (150 ml) was heated overnight at 90° C. The reaction mixture was poured into ice water and extracted with diethyl ether. The dried extract was freed of solvent and the filtrate residue chromatographed of Woelm's silica gel, using a mixture of benzene and hexane (1:1 parts by volume) as eluent. The column held fractions were then eluted with ethyl acetate and rechromatographed to yield 2.75 grams (melting point 74° to 75° C.) of 4-hexyloxy-3'-methyl-4'-nitrodiphenylamine which was characterized by its nuclear magnetic resonance spectrum. This was reduced to the corresponding 4'-amino derivative which was converted to the 2,4,6-triisopropylbenzenesulfonamide, as described above. This was then recrystallized from isopropanol-acetone to provide a tan solid (3.1 grams) having a melting point of 151° to 152° C. The desired product was characterized by nuclear magnetic resonance. It was also identified by elemental analysis.

EXAMPLE 7

Preparation of 4-(N,N-dihexylamino)-2'-[delta-2,4-di-tertiary-amylphenoxy)butylsulfamyl]-4'-benzenesulfonamidodiphenylamine A solution of 2,4-di-tertiary-amylphenoxybutylamine (3.05 grams, 0.01 mole) in dry dioxane (25 ml) was added to a solution of 2-chloro-5-nitrobenzenesulfonyl chloride in dry dioxane and the mixture stirred for three hours at 100° C. This was poured into water (200 ml), stirred for one hour, and the pale yellow solids recrystallized from methanol. The resulting nitro intermediate (2.6 grams) had a melting point of 154° to 156° C. The desired intermediate was identified by elemental analysis.

This intermediate was condensed with N,N-dihexyl-p-phenylenediamine paratoluenesulfonate, as described, and the chromatographed product was characterized by elemental analysis. The product was an orange oil (2.45 grams).

This latter product was reduced to the corresponding amine and converted, as described above, to the benzenesulfonamide. This product was an amber glass (1.4 grams) which crystallized on standing. The desired product was identified by elemental analysis.

EXAMPLE 8

Preparation of 4-[N-ethyl-N-(β-methanesulfonamidoethyl)amino]-2-methyl-2'-octanamido-4'-(2,4,6-triisopropylbenzenesulfonamido)diphenylamine The following preparation of a desired intermediate was carried out:

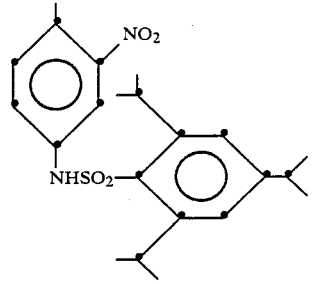

A solution of 4-fluoro-3-nitroaniline (15.6 grams, 0.1 mole) in pyridine (400 ml) was stirred at room temperature and 2,4,6-triisopropylbenzenesulfonyl chloride (30.2 grams, 0.1 mole) was added in bulk. The resulting solution was stoppered tightly and stirred at room temperature (about 20° C.) overnight (about 18 hours). The reaction mixture was then poured over an ice hydrochloric acid (aqueous) mixture (500 grams of ice and 500 ml of concentrated aqueous HCl). An oily solid separated and was removed by filtration. Repeated recrystallization from methanol and water provided 30.2 grams of light golden crystals having a melting point of 151° to 152° C. The desired intermediate product was identified by elemental analysis.

The following reaction was then carried out:

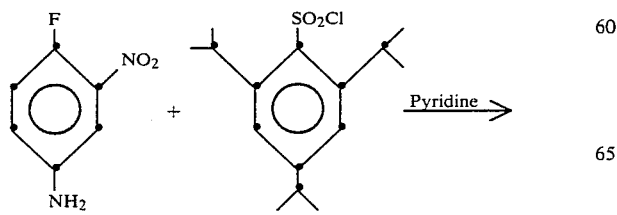

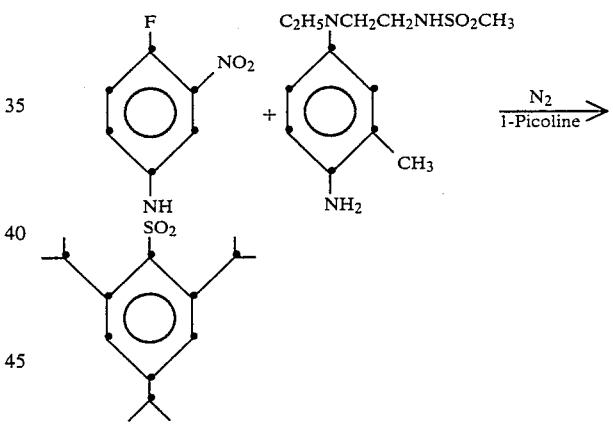

This reaction was carried out as follows:

42.2 Grams (0.1 mole) of 2-fluoro-5-(2,4,6-triisopropylbenzenesulfonamido)nitrobenzene in 275 ml of 1-picoline was stirred at reflux under nitrogen for three days with 40.6 grams (0.15 mole) of 4-amino-3-methyl-N-ethyl-N-(β-methanesulfonamidoethyl)aniline (in the form of a free base). The reaction solution was allowed to cool to room temperature and was poured over an ice water mixture (1.5 liters). The mixture was allowed to stand until a red-brown oil separated. The aqueous layer was decanted from the oil. The oil was dissolved in $CH_2Cl_2$ (about 400 ml). The methylene chloride solution was then washed with vigorous agitation with 5 percent hydrochloric acid (50 ml concentrated HCl plus 380.5 ml of water) four times (500 ml), then with 5 percent $NaHCO_3$ (four times, 500 ml) and finally with 500 ml of water (four times). The methylene chloride layer was dried by means of sodium sulfate and then swirled with a filtering composition (Florisil) to remove a purple residue. Evaporation of the solvent provided a red oil which was taken up in about 150 ml of boiling methanol. The methanol solution was allowed to cool to room temperature overnight. A yellow-orange crystalline product (42.8 grams) having a melting point of 164° to 166° C. was produced. Thin layer chromatography on silica gel-glass and recrystallization from ethyl acetate provided the desired pure product which was identified by elemental analysis.

The following reaction was then carried out:

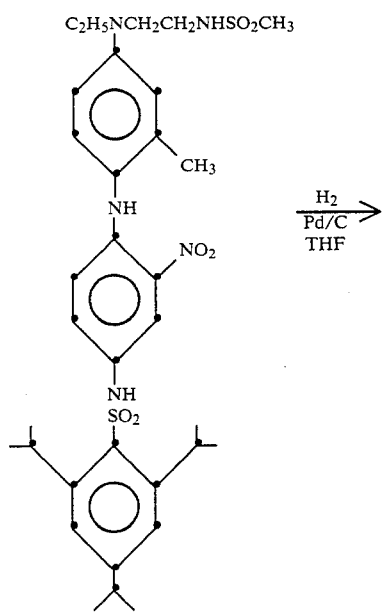

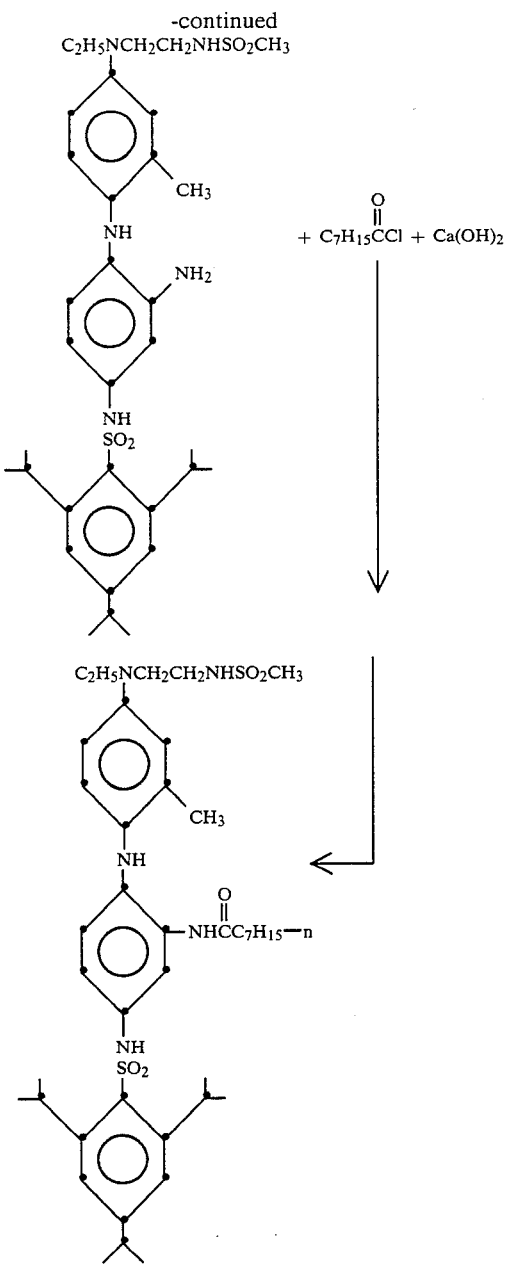

6.7 Grams (0.01 mole) of the nitro compound in about 75 ml of tetrahydrofuran was reduced over 10 percent palladium on charcoal at 40 psi in a hydrogen atmosphere until the hydrogen uptake ceased (within about 2.5 hours). The reaction mixture was blanketed with nitrogen and removed from the Parr apparatus. No attempt was made to remove the catalyst at this point. The calcium hydroxide (0.41 grams, 0.055 mole), used as an HCl scavenger, was added in bulk to the reaction mixture. Next, the octanoyl chloride (1.8 grams, 0.011 mole) was added in bulk to the reduction mixture. The resulting reaction mixture was stoppered tightly and allowed to be stirred at room temperature for 3 hours. No exothermic properties were observed. The catalyst and calcium salts were removed by filtration. The solvent was evaporated to yield a brown oil. The oil was taken up in boiling ether. The oil dissolved, and a precipitate began to form. Filtering provided a colorless solid with a strong octanoyl chloride odor. The solid was re-suspended in boiling ether (100 ml), then filtered and vacuum dried at room temperature to yield 6.0 grams of a very faintly yellow-tinted solid having a melting point of 98° to 100° C. Thin layer chromatography with silica gel on glass showed one component with a variety of solvents (ethyl acetate, methylene chloride, acetone and acetonitrile). The compound was further characterized by infrared analysis, nuclear magnetic resonance, mass spectrography and elemental analysis. Oxidation with aqueous potassium ferricyanide yielded a green dye.

EXAMPLE 9

Preparation of 4-hexyloxy-2'-pivalamido-4'-(2,4,6-triisopropylbenzenesulfonamido)diphenylamine 42.2 Grams (0.10 mole) of the fluoronitro compound identified in Example 8 as the product of the reaction of 4-fluoro-3-nitroaniline and 2,4,6-triisopropylbenzenesulfonyl chloride was stirred at reflux under nitrogen overnight (about 24 hours) with 21.2 grams (0.11 mole) of p-hexyloxyaniline in 100 ml of picoline. This reaction is illustrated as follows:

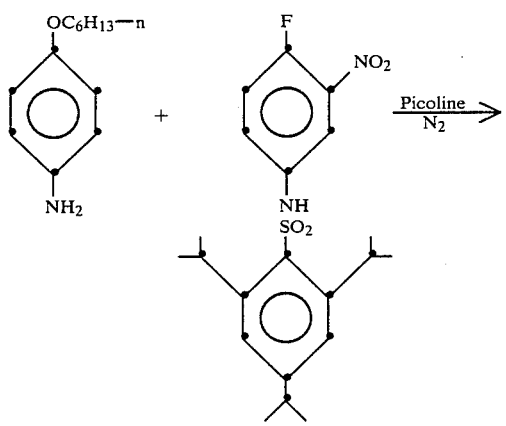

-continued

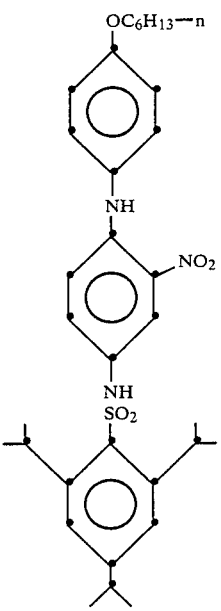

The reaction mixture was then poured over an ice and water mixture (about 1.5 liters). An oil separated, but failed to crystallize. The water was decanted and the oil was taken up in methylene chloride (150 ml). The methylene chloride solution was washed well with water, dried by means of sodium sulfate and evaporated to a reddish-brown oil. The oil was taken up in boiling 95° percent ethanol. Upon cooling, a red crystalline solid separated. Thin layer chromatography with silica gel on glass and then purification with ethyl acetate-ligroin (1:4 parts by volume) showed some slight impurity. Recrystallization a second time from 95 percent ethanol provided a red crystalline solid with a strong odor of picoline. The solid was stirred in 250 ml of a mixture of 1:1 parts by volume of (a) 95 percent methanol and 5 percent ethanol, with (b) water, for 30 minutes, then filtered and air dried to yield the desired product (49.5 grams) having a melting point of 147° to 148° C. The desired product was also identified by elemental analysis. The following reaction was then carried out:

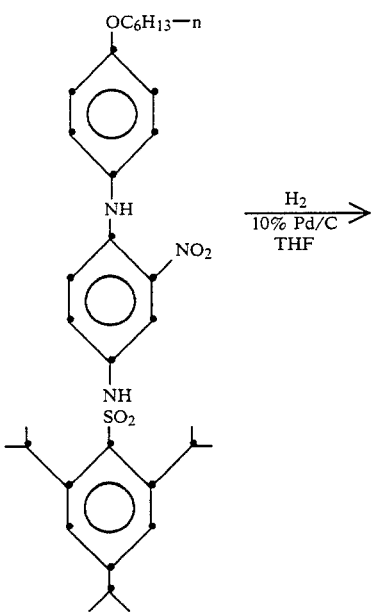

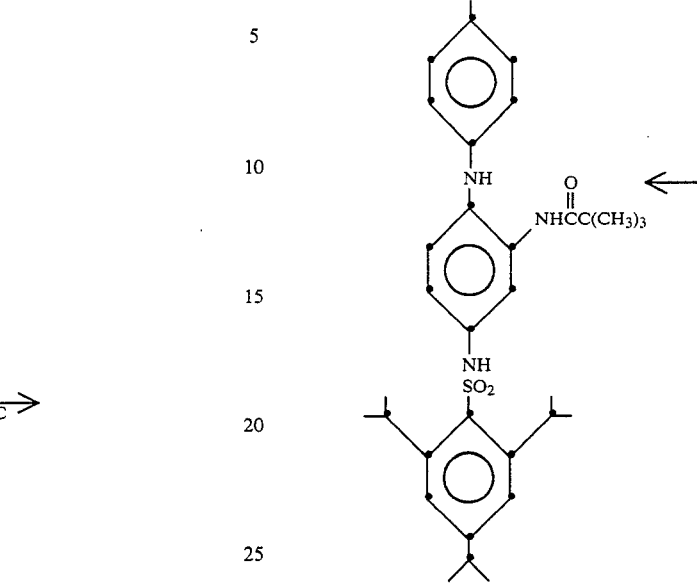

15.0 Grams (0.025 mole) of the nitro compound was dissolved in 100 ml of tetrahydrofuran at room temperature and was reduced at 40 psi hydrogen pressure under 10 percent palladium on charcoal on a Parr shaker until hydrogen uptake ceased (about two hours). The originally orange solution was colorless at this point. In previous preparations, the catalyst was removed by filtration under nitrogen. This resulted in some discoloration as the amine is prone to oxidation. Therefore, calcium hydroxide (1.11 grams, 0.015 mole) was added directly to the reduction mixture, followed by bulk addition of pivaloyl chloride (3.63 grams, 0.03 mole). The mixture was stoppered tightly and stirred for one hour. Thin layer chromatography with silica gel/glass using ethyl acetate:ligroin (1:4 parts by volume) showed no unreacted amine (both amine and product are oxidized by aqueous potassium ferricyanide to red dyes). The mixture was then filtered to remove the calcium chloride and catalyst. The solvent was removed at reduced pressure to yield a light rose-colored oil. The oil was taken up in 100 ml of hot ligroin. Upon cooling, a few crystals formed but the majority of product boiled out. The flask was placed on a vacuum evaporator and solvent evaporated. After only a few milliliters of solvent were removed, the product solidified. The colorless solid was removed from the red mother liquor by filtration and was washed with a small quantity of ligroin. 15.0 grams of colorless air dried solid having a melting point of 122° to 124° C. were obtained. The desired product was identified by elemental analysis.

EXAMPLE 10

Preparation of 4-(N,N-diethylamino)-2-methyl-2'-methoxy-5'-pivalamido-4'-(2,4,6-triisopropylbenzenesulfonamido)-diphenylamine The following reaction was carried out:

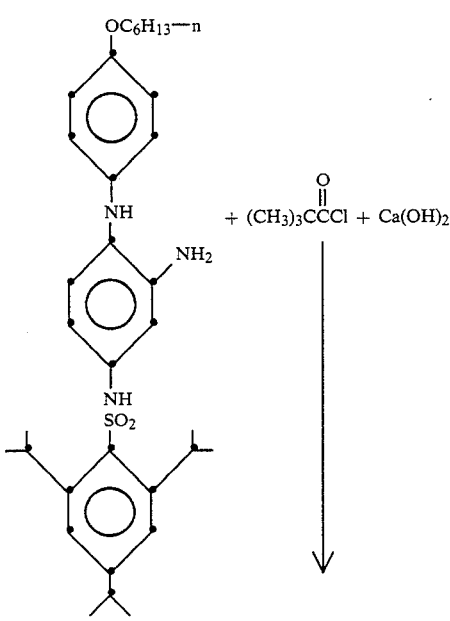

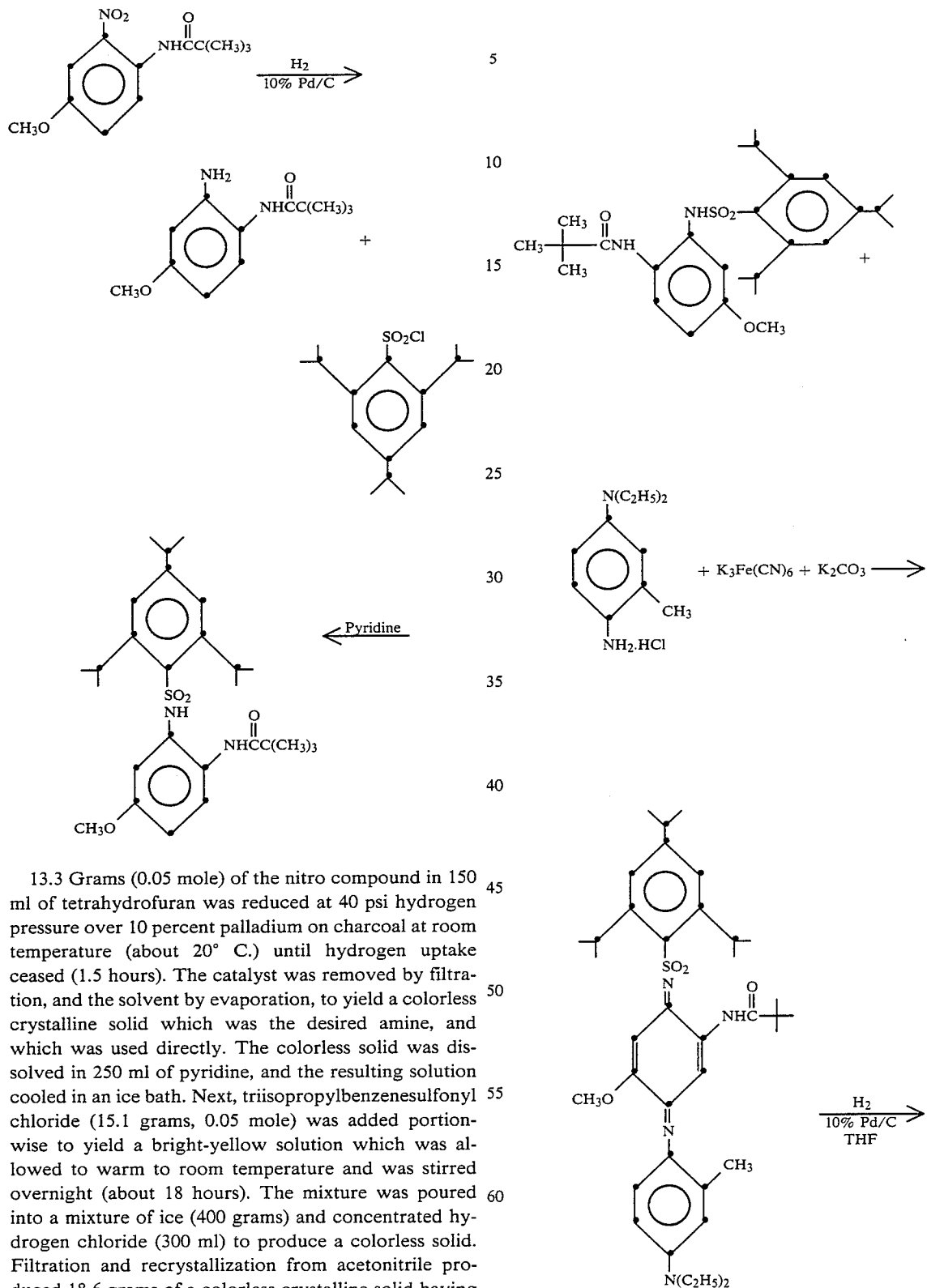

13.3 Grams (0.05 mole) of the nitro compound in 150 ml of tetrahydrofuran was reduced at 40 psi hydrogen pressure over 10 percent palladium on charcoal at room temperature (about 20° C.) until hydrogen uptake ceased (1.5 hours). The catalyst was removed by filtration, and the solvent by evaporation, to yield a colorless crystalline solid which was the desired amine, and which was used directly. The colorless solid was dissolved in 250 ml of pyridine, and the resulting solution cooled in an ice bath. Next, triisopropylbenzenesulfonyl chloride (15.1 grams, 0.05 mole) was added portionwise to yield a bright-yellow solution which was allowed to warm to room temperature and was stirred overnight (about 18 hours). The mixture was poured into a mixture of ice (400 grams) and concentrated hydrogen chloride (300 ml) to produce a colorless solid. Filtration and recrystallization from acetonitrile produced 18.6 grams of a colorless crystalline solid having a melting point of 177° to 178° C. This desired intermediate was identified by elemental analysis.

Then the following reaction was carried out:

33
-continued

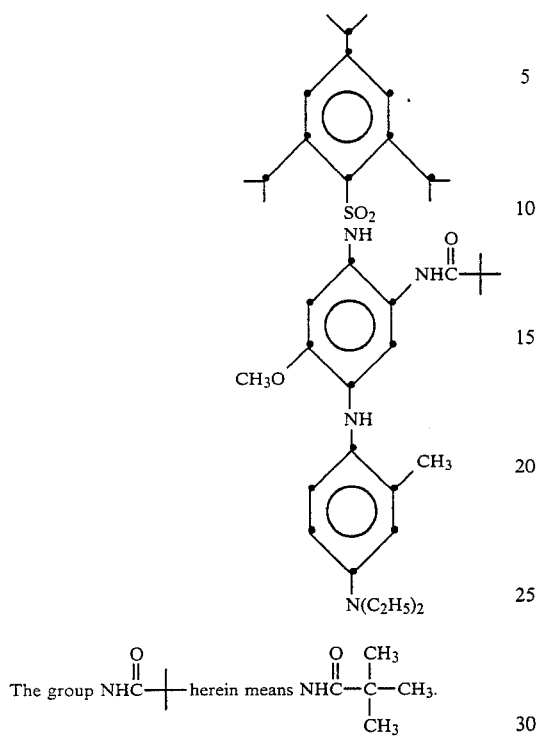

The group $\underset{\overset{\|}{O}}{NHC}\!\!-\!\!\!\!\!\!\!\!\top$ herein means $\underset{\overset{\|}{O}}{NHC}\!-\!\!\underset{\underset{CH_3}{|}}{\overset{\overset{CH_3}{|}}{C}}\!\!-\!CH_3$.

The following solutions were prepared:
Solution A: 10.0 Grams (0.02 mole) of the starting intermediate in 150 ml of tetrahydrofuran;
Solution B: 4.2 Grams (0.02 mole) of N,N-diethyl-3-methyl-p-phenylenediamine hydrochloride in 60 ml of water;
Solution C: 26.3 Grams (0.08 mole) of potassium ferricyanide in 125 ml of water; and,
Solution D: 11.0 Grams (0.08 mole) of potassium carbonate in 25 ml of water.

Addition of Solution A and then Solution B to Solution D produced no color change. Next, Solution C was added to the previous mixture dropwise in 15 minutes. A green dye formed. The mixture was stirred for two hours following the addition; then diluted to one liter with water. The dye was extracted into methylene chloride, washed well with water, dried by means of sodium sulfate and evaporated under pressure to yield the crude green dye as a thick oil (approximately 15 grams). The crude dye was dissolved in tetrahydrofuran and reduced over 10 percent palladium on charcoal at 40 psi hydrogen pressure, at room temperature, until hydrogen uptake ceased (30 minutes). Filtration provided a brown-magenta solution. Solvent was evaporated and replaced with methylene chloride (about 300 ml). The magenta-brown solution was slurried with a filtering composition (Florisil) (10 grams) and filtered to yield a pale green solution. The solvent was evaporated to yield a crude pale green solid. Recrystallization from methanol-water failed to remove the trace of dye present. The sample was then repeatedly recrystallized from ether-hexane until constant melting point was reached. The melting point of the desired product was 201° to 202° C. The desired product was identified by elemental analysis.

34

EXAMPLE 11

Preparation of 4-[N-ethyl-N-(β-methanesulfonamidoethyl)-amino]-2-methyl-2′,5′-dipivalamido-4′-(2,4,6-triisopropylbenzenesulfonamido)diphenylamine The following reaction was carried out:

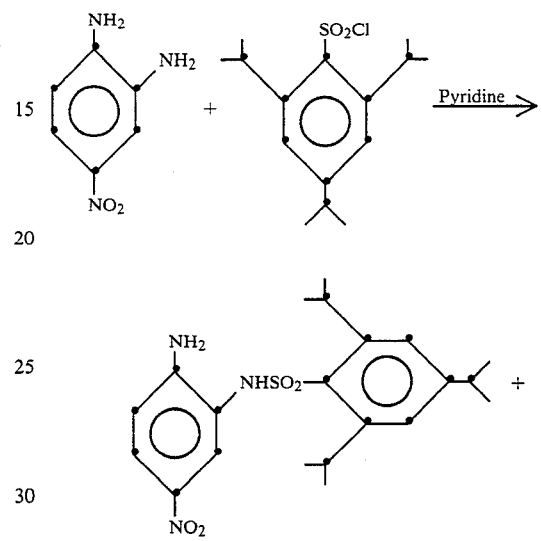

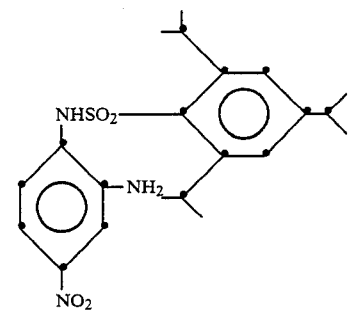

15.3 Grams (0.1 mole) of the 4-nitro-o-phenylenediamine was dissolved in 200 ml of pyridine and the solution cooled in an ice bath. After one hour, a solution of 31.2 grams (0.1 mole) of 2,4,6-triisopropylbenzenesulfonyl chloride in 100 ml of tetrahydrofuran was added to the amine solution. The resulting mixture was stirred overnight at room temperature and was next poured over ice (400 grams) plus 300 ml of glacial acetic acid. An oil separated and solidified upon standing. The crude solid was removed by filtration and recrystallized twice from methanol-water to yield a yellow crystalline solid (27.6 grams) having a melting point of 187° to 191° C. Thin layer chromatography on silica gel (hexane:ethyl acetate; 3:2 by volume) indicated a major and minor component mixture, as indicated by the structures above. The desired intermediate was identified by elemental analysis.

The following reaction was then carried out:

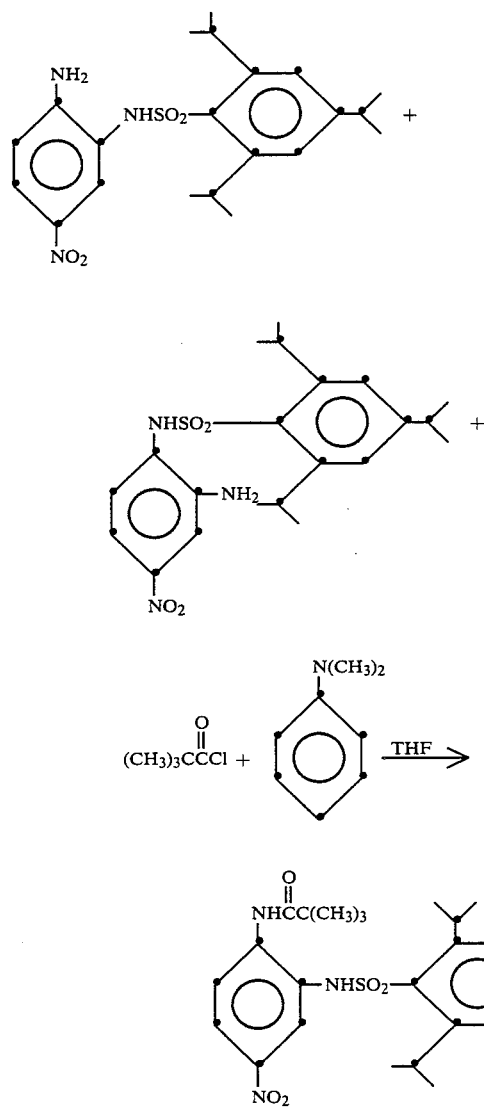

21.0 Grams (0.05 mole) of the crude amine was dissolved in 250 ml of tetrahydrofuran and 6.6 grams (0.05 mole) of the acid scavenger, N,N-dimethylaniline, was added in bulk. To this solution was added, dropwise in 15 minutes, 6.6 grams (0.05 mole) of the pivaloyl chloride. After stirring at room temperature overnight (at about 20° C.), thin layer chromatography indicated an incomplete reaction. Thus, an additional 5 millimoles of acid chloride and base were added, and the mixture stirred overnight again. The mixture was diluted with methanol (100 ml), then quenched in one liter of water. An oil separated and solidified. The solid obtained was recrystallized from methanol-water to provide 24.6 grams of solid having a melting point of 160° to 162° C. This material contained a small amount (less than 2 percent) of the following isomeric compound:

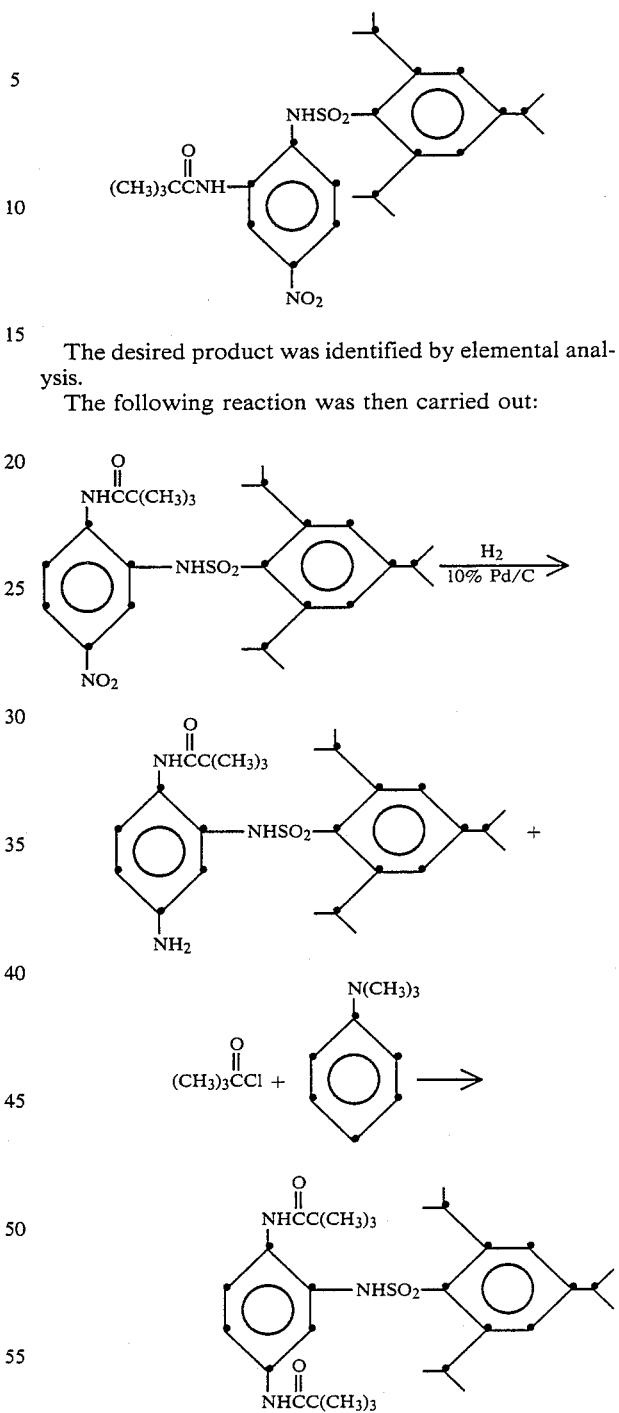

The desired product was identified by elemental analysis.

The following reaction was then carried out:

101.1 Grams (0.02 mole) of the nitro compound were reduced at room temperature in 125 ml of tetrahydrofuran over 10 percent palladium on charcoal at 40 psi hydrogen pressure until hydrogen uptake ceased (1.5 hours). The catalyst was removed by filtration. 2.5 grams (0.021 mole) of the acid scavenger, N,N-dimethylaniline, was added in bulk; followed by bulk addition of 2.5 grams (0.021 mole) of pivaloyl chloride. The mixture was stoppered and stirred overnight at room temperature. Solvent was then evaporated to yield an amber oil. The oil was crystallized from ethanol-water to yield 10.2 grams of colorless solid having a melting point of 196° C. This desired intermediate was identified by elemental analysis.

The structure of the intermediate was confirmed by making the same compound by an alternate synthetic route:

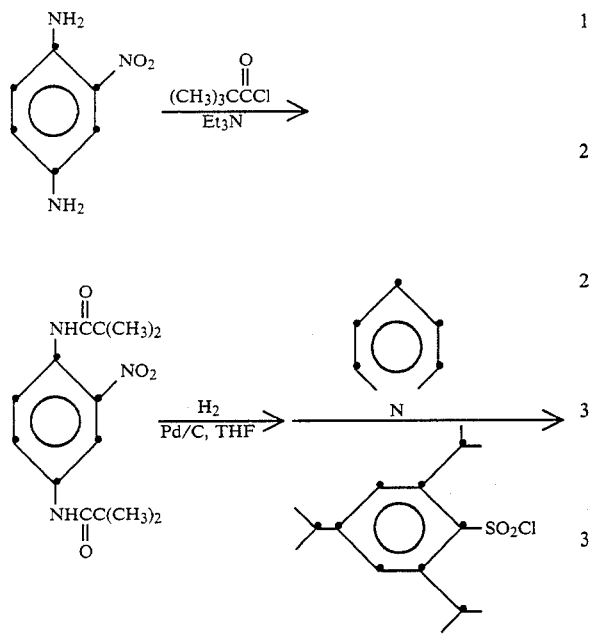

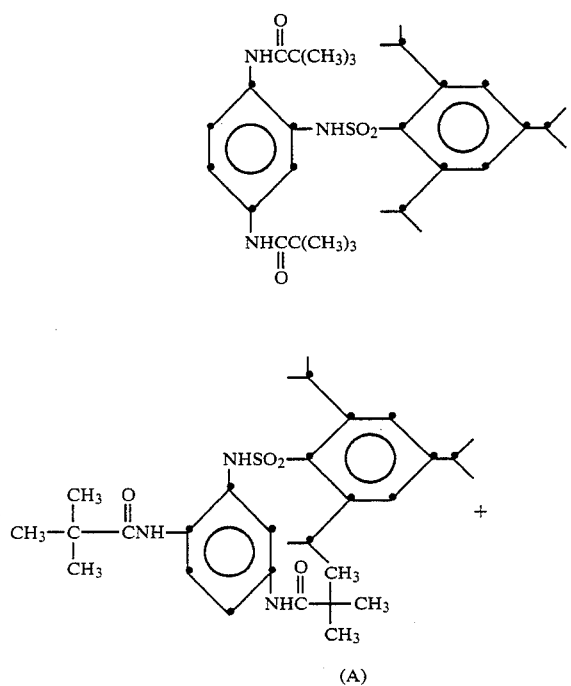

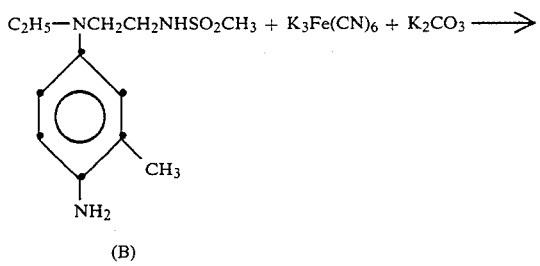

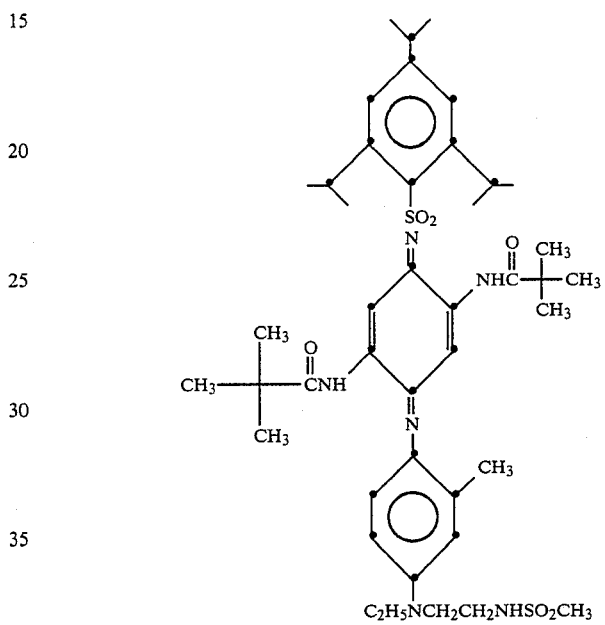

10.5 Grams (0.02 mole) of the coupler (A) and 5.4 grams (0.02 mole) of the reducing agent (B) were dissolved in 200 ml of tetrahydrofuran. With rapid stirring, the aqueous potassium carbonate solution (11.0 grams, 0.08 mole in 50 ml of water) was added to the tetrahydrofuran solution of (A) and (B). Finally, the aqueous potassium ferricyanide solution (26.3 grams, 0.08 mole in 150 ml of water) was added dropwise to the above solution. A green dye began to form during the addition. Following the addition, the reaction mixture was allowed to be stirred for 45 minutes and then was quenched in one liter of water. The dye was extracted into methylene chloride, washed well with water, and dried by means of sodium sulfate. It was then evaporated to yield a green oil. The oil was chromatographed in Woelm's silica gel with an ethyl acetate-hexane (8:2 parts by volume) eluent to yield 12.0 grams of green dye as a green glass (maximum absorption in butyl acetate of 672 nm). The glass was used directly without further purification.

The following reaction was carried out:

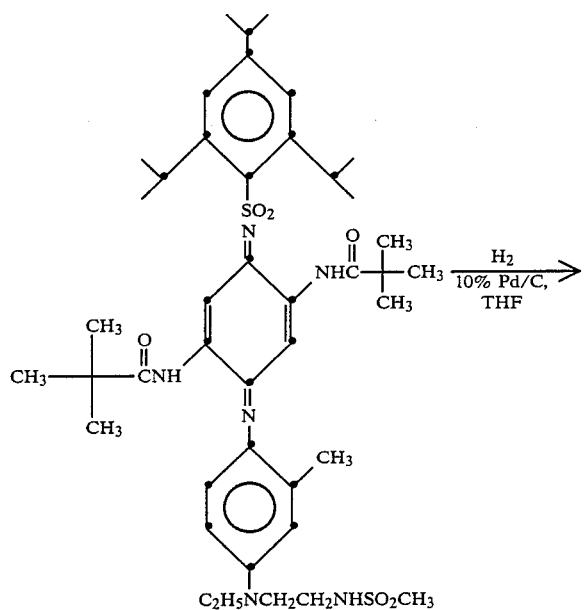 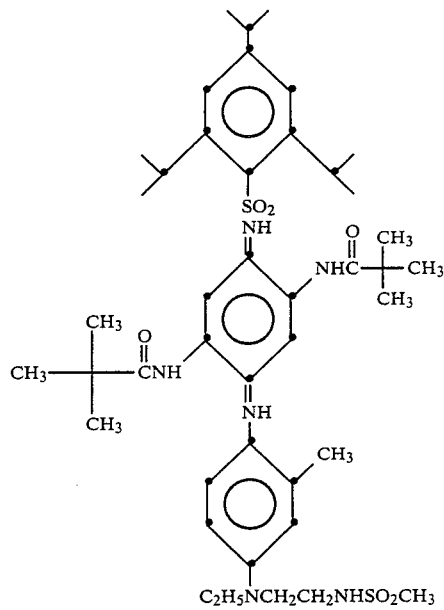

The glass obtained above was dissolved in tetrahydrofuran and reduced over 10 percent palladium on charcoal at room temperature (about 20° C.) and 40 psi hydrogen pressure until hydrogen uptake ceased (about 5 minutes). The catalyst was removed by filtration and the solvent was evaporated at reduced pressure to yield a light blue oil. The oil was recrystallized from ether-hexane (2.5:1 parts by volume) to yield 8 grams of colorless solid having a melting point of 166° to 168° C. The desired product was identified by elemental analysis.

EXAMPLE 12

Preparation of 3-Methanesulfonamido-2'-octanamido-4'-(2,4,6-triisopropylbenzenesulfonamido)diphenylamine The following reaction was carried out:

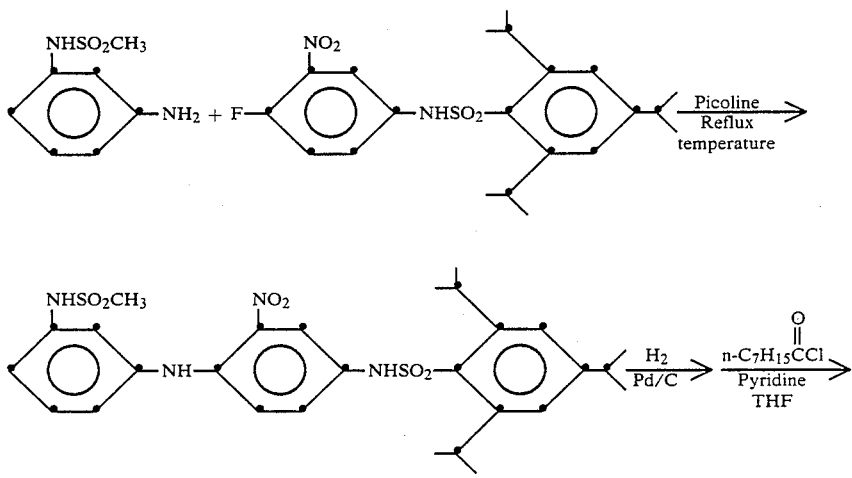

-continued

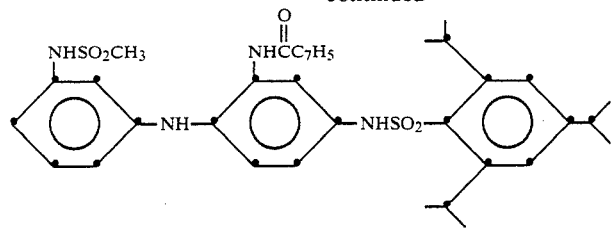

A mixture of meta-methanesulfonamidoaniline (1.86 grams, 0.01 mole) and 2-fluoro-5-(2,4,6-triisopropylbenzenesulfonamido)nitrobenzene (4.29 grams, 0.01 mole) in 25 ml of α-picoline was refluxed for 29 hours. This mixture was poured into a mixture of 100 grams of ice and 100 ml of 1N hydrochloric acid, and the separated oil extracted with 100 ml of ethyl acetate. The extract was washed with water, dried by means of anhydrous sodium sulfate, and freed of solvent. The resulting oil was chromatographed on Woelm's silica gel using methylene chloride as the eluent. The column held material was eluted with 1:1 parts by volume methylene chloride-ethyl acetate, freed of solvent, and characterized as 3-methanesulfonamido-2'-nitro-4'-(2,4,6-triisopropylbenzenesulfonamido)diphenylamine. This compound was identified by nuclear magnetic resonance. 2.9 grams of the oily product were dissolved in 150 ml of 1:1 methanol-tetrahydrofuran and reduced with hydrogen over a palladium-charcoal catalyst by means of a Parr apparatus. After removal of catalyst and solvent, the solid product was characterized by nuclear magnetic resonance as 3-methanesulfonamido-2'-amino-4'-(2,4,6-triisopropylbenzenesulfonamido)diphenylamine. 1.5 grams (0.003 mole) of this compound were then dissolved in 20 ml of dry pyridine and reacted at 5° C. with 6.5 grams of octanoyl chloride in 20 ml of dry tetrahydrofuran. After 18 hours at 25° C., the reaction mixture was poured into ice and 20 ml of concentrated hydrochloric acid, and the separated oil extracted with methylene chloride. The extract was washed with 10 percent sodium bicarbonate in water, dried, and freed of solvent. The resulting oil was purified by pressure liquid chromatography to yield 1.3 grams of a glass that was recrystallized from ether-hexane to give white leaflets. The desired product was characterized by nuclear magnetic resonance and had a melting point of 146° to 148° C. A sample of this compound was oxidized in butyl acetate with potassium ferricyanide in pH 10 buffer, yielding a yellow dye possessing a maximum absorption of 429 nm.

EXAMPLE 13

Preparation of N-benzenesulfonyl-N'-(4-(N,N-diethylamino)phenyl-p-benzoquinone diimine cyan dye A solution of 4-(N,N-diethylamino)-4'-(phenylsulfonamido)diphenylamine (2 grams, 0.005 mole) in 50 ml of ethyl acetate was stirred for 5 minutes with potassium carbonate (2.76 grams, 0.02 mole) in 50 ml of water. A solution of potassium ferricyanide (3.29 grams, 0.01 mole) in 30 ml of water was then added dropwise under a nitrogen atmosphere and stirring was continued to 15 minutes. The organic phase (cyan hue) was separated, washed with water, dried over anhydrous sodium sulfate, and then evaporated to dryness. Attempted recrystallization of the resulting crude dye residue from warm acetonitrile deposited a black amorphous solid (1.65 grams), partially soluble in a mixture of dimethyl formamide and tetrahydrofuran with the disappearance of cyan hue. Spectral analysis and thin layer chromatographic analysis indicated the presence of considerable color-forming dye in the amorphous mixture, with an elemental analysis agreeing with the structure:

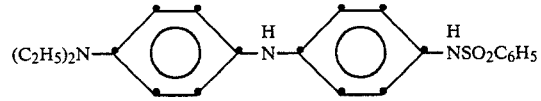

Subsequent treatment of the amorphous mixture in alkaline (1N potassium hydroxide) ethyl acetate with K$_3$Fe(CN)$_6$ produced a soluble cyan dye.

Analysis of this regenerated cyan dye by thin layer chromatography found it to be identical with the structure:

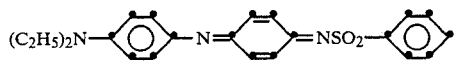

Oxidation of the parent para-sulfonamidodiphenylamine in a single phase, aqueous, alkaline environment by means of potassium ferricyanide yielded the desulfonaminated indoaniline dye:

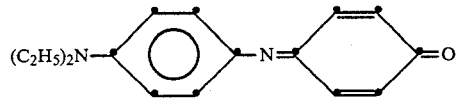

EXAMPLE 14

Use in a Photographic Silver Halide Material

The color-forming compound synthesized by the procedure described in Example 5 was incorporated into a photographic silver halide material.

A coating composition was prepared containing a photographic silver bromide emulsion comprising the color-forming compound dispersed in a solvent and coated on a subbed poly(ethylene terephthalate) film support. The resulting photographic element contained a silver coverage of 11.2 mg per square decimeter. The coating contained silver bromide in a gelatino emulsion, with a dispersion of 4.9 mg per square decimeter of the color-forming compound dissolved in 9.7 mg per square decimeter of the solvent which was N-n-butyl acetanilide.

A sample of the photographic element was imagewise exposed in a commercial sensitometer for $10^{-4}$ seconds through a 1.0 neutral density filter. This provided a developable latent image in the photographic element.

Processing was conducted as follows: 60 seconds development in the following developer:

| | |
|---|---|
| sodium hexametaphosphate and tripolyphosphate | 2.0 grams |
| N—methyl-p-aminophenol sulfate (developing agent) | 6.0 grams |
| sodium sulfite, anhydrous | 50.0 grams |
| sodium carbonate, anhydrous | 30.0 grams |
| hydroquinone (developing agent) | 6.0 grams |
| potassium bromide | 2.0 grams |
| sodium thiocyanate | 1.3 grams |
| sodium hydroxide | 2.0 grams |
| potassium iodide (0.1 percent aqueous solution) | 6.0 ml |
| water to (pH 10.1 to 10.3) | 1 liter |

After development, the element was washed for 60 seconds in water and then re-exposed by means of a flash exposure to light. The element was then immersed for 30 seconds in a pH 12 buffered developer solution containing 1 gram per liter of 4-methyl-4-hydroxymethyl-1-phenyl-3-pyrazolidone, 1 gram per liter of potassium bromide and 10 ml per liter of benzyl alcohol. The resulting element was then washed for 60 seconds in water and then soaked for 60 seconds in the following composition:

| | |
|---|---|
| NaFe ethylenediamine tetraacetic acid | 40 g |
| ethylenediamine tetraacetic acid | 4 g |
| KI | 1 g |
| 20% aqueous ammonia solution | 10 ml |
| ammonium thiosulfate, crystalline | 100 g |
| sodium sulfite, anhydrous | 2 g |
| sodium thiosulfate (20% by weight aqueous solution) | 50 ml |
| water to (pH 6.2–6.5) | 1000 ml |

After soaking, the element was then washed with water and permitted to dry in room air. This produced a dye only reversal cyan dye image having a maximum image density of 1.41 and a minimum density of 0.17 (at 680 nm).

EXAMPLE 15

Use of Color-Forming Compounds in a Printout Imaging Material

The color-forming compound of Example 8 was used in an imaging element to provide a negative dye image. The imaging material contained the following composition coated on a poly(ethylene terephthalate) film support at the noted coverages:

color-forming compound of Example 8   4.2 g/dm$^2$
lophine dimer represented by the formula:

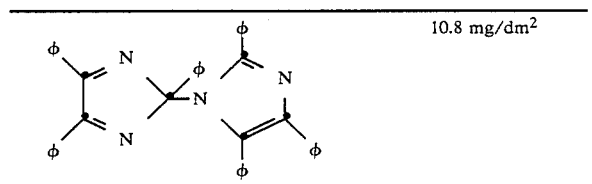

10.8 mg/dm$^2$

φ herein means phenyl.
poly(methylmethacrylate) (binder)   32.4 mg/dm$^2$
(Elvacite 2010, which is trademark of and available from the E. I. duPont de Nemours and Company, Inc., U.S.A.)

After drying the resulting element, the element was imagewise exposed to high intensity light in a commercial lithographic plate making apparatus (NuArc platemaker, which is available from the Nu-Arc Company, Inc., U.S.A.). The high intensity exposure produced a visible image having a maximum image density of 0.51 and a minimum density of 0.06 read in red light.

The procedure was repeated with the lophine dimer omitted, which produced no dye formation.

EXAMPLE 16

Preparation of 4-(N,N-dimethylamino)-2-phenylsulfonyl-4'-(2,4,6-triisopropylbenzenesulfonamido)diphenylamine A solution of p-nitrophenoxyacetic acid (10 grams, 0.05 mole) in excess thionyl chloride (about 50 ml) with a few drops of dimethylformamide was refluxed for 2 hours. The thionyl chloride was removed under reduced pressure, and the residue treated twice with hexane and then evaporated. The solid was dissolved in tetrahydrofuran and added dropwise to a stirred solution of 4-dimethylamino-2-phenylsulfonylaniline (13.8 grams, 0.05 mole) and N,N-diisopropylethylamine (7.0 grams, 0.055 mole) in tetrahydrofuran.

After stirring at room temperature for 18 hours, the reaction mixture was filtered to remove the salt. Evaporation of the filtrate provided a solid. This was rinsed from the flask with cold methanol, filtered, dried and characterized as 4-dimethylamino-2-phenylsulfonyl-α-(4-nitrophenoxy)acetanilide (19.4 grams) having a melting point of 222° to 225° C. The product was also identified by nuclear magnetic resonance. A solution of the above material (4.6 grams, 0.01 mole) in 2-methoxyethanol (70 ml), ethanol (90 ml), and sodium hydroxide (10 ml, 2.5N) was refluxed for 1.5 hours, acidified with acetic acid and cooled. The collected liquid (2.8 grams) was recrystallized from CH$_3$CN to provide 4-dimethylamino-4'-nitro-2-phenylsulfonyldiphenylamine (2.3 grams) having a melting point of 234° to 235° C. This product was further identified by nuclear magnetic resonance.

The resulting material (2.1 grams, 0.0053 mole) was hydrogenated on palladium-charcoal at 40 psi hydrogen pressure until hydrogen uptake ceased (3 hours). This produced the desired amine. After removal of the catalyst by filtration through a filtering composition (Celite), the filtrate was dried by means of sodium sulfate and 2,4,6-triisopropylbenzenesulfonyl chloride (1.6 grams, 0.053 mole) and N,N-diisopropylethylamine (0.7 grams, 0.0053 mole) was added. The solution was refluxed under a nitrogen atmosphere for 18 hours, cooled, filtered to remove the salt, and evaporated. The residue was recrystallized from CH$_3$CN. The desired product had a melting point of 221° to 225° C. and was further identified by nuclear magnetic resonance. It was also identified by elemental analysis.

EXAMPLE 17

Preparation of 4-(N,N-diethylamino)-2-methyl-3'-methyl-4'-(2,4,6-triisopropylbenzenesulfonamido)diphenylamine The following synthesis was carried out to prepare the desired intermediate:

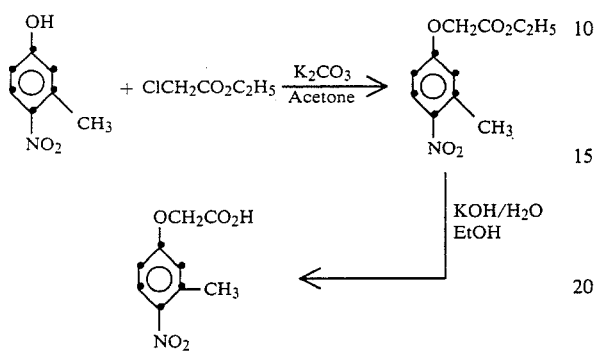

15.3 Grams of 3-methyl-4-nitrophenol and 13 grams of ethyl chloroacetate were dissolved in acetone and refluxed over 16 grams of potassium carbonate for two days. The solution was filtered, the filtrate poured into water, and extracted with ethyl acetate. The ethyl acetate extracts were evaporated to provide an oil which was dissolved in 300 ml of ethanol. To this was added 10 grams of potassium hydroxide in 50 ml of water. The mixture was heated for two hours on a steam bath, most of the ethanol evaporated, acidified with hydrochloric acid, diluted with water, filtered, and the solid dried. Recrystallization of the solid from acetonitrile yielded 8.5 grams of the desired product.

Then the following reaction was carried out:

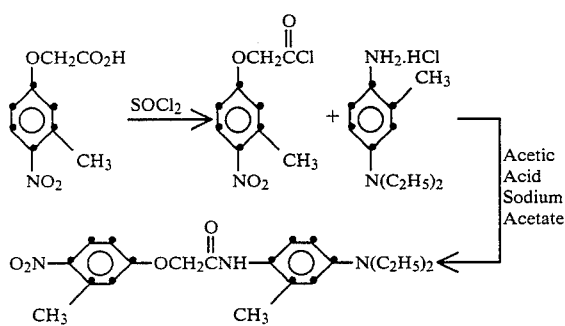

8.4 Grams (0.04 mole) of (3-methyl-4-nitrophenoxy)acetic acid was dissolved in about 35 ml of thionyl chloride with three drops of dimethylformamide and heated for two hours. The excess thionyl chloride was evaporated and the residue dissolved in methylene dichloride and evaporated twice. The residue was then dissolved in glacial acetic acid and added to 8.6 grams of the substituted p-phenylenediamine salt in acetic acid. 8.0 grams of sodium acetate were added, whereupon the solutions warmed. After stirring for two hours, the solution is poured into water. A solid precipitates and is filtered off and dried. Recrystallization twice from methanol yielded a desired compound having a melting point of 141° to 142° C. The product was identified by nuclear magnetic resonance and carbon-hydrogen-nitrogen analysis indicated the product as desired.

Then the following reaction was carried out:

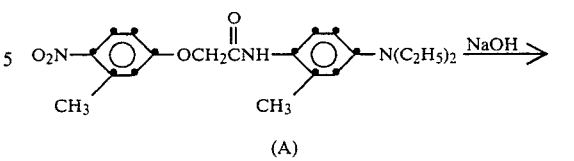

(A)

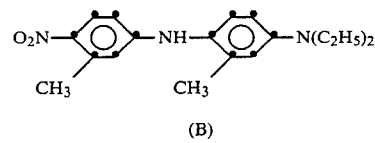

(B)

To a solution of 7 grams of compound (A) in 140 ml of 2-methoxyethanol and 140 ml of ethanol was added a solution of 2 grams of sodium hydroxide in 20 ml of water. The combination was then refluxed for two hours, cooled, and acidified with acetic acid. Most of the ethanol was removed and the remainder poured into water. This caused a solid to form, which was filtered out and dried. Recrystallization from acetonitrile yielded the desired compound having a melting point of 132° to 133° C.

Then the following reaction was carried out:

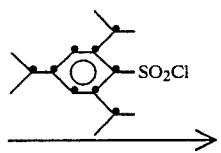

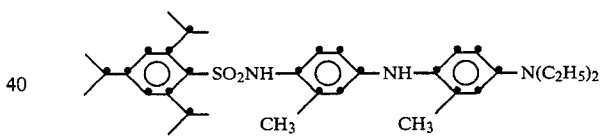

1.8 Grams (0.006 mole) of compound (B) was dissolved in 100 ml of tetrahydrofuran and reduced over a palladium-charcoal catalyst with hydrogen at 40 psi hydrogen pressure. The catalyst was filtered off, and the filtrate dried over sodium sulfate. To this filtrate was added 1.74 grams (0.13 mole) of the sulfonyl chloride and N,N-diisopropylethylamine (sometimes referred to as Hünig's base). The solution was heated at reflux overnight under nitrogen. After the tetrahydrofuran was evaporated, the dark blue residue was dissolved in ethyl acetate, washed with water, dried and concentrated. The residue was then dissolved in methylene dichloride and chromatographed on Woelm's silica gel to remove impure fractions. The main component fractions were isolated and concentrated. Tetrahydrofuran was again added and hydrogen reduction at 40 psi hydrogen pressure over palladium-charcoal catalyst was carried out. The catalyst was removed by filtration, and the filtrate concentrated to a yellow oil. The oil was dissolved in hot hexane. Upon cooling the mixture, a white solid separated. The white solid was the desired product having a melting point of 152° to 154° C. This product was identified by nuclear magnetic resonance and also by elemental analysis.

The compounds given in following Examples 19 through 183 were prepared by procedures like those described in Examples 1 through 18:

EXAMPLE 18

4-Morpholino-4'-(2,4,6-triisopropylbenzenesulfonamido)diphenylamine (melting point 203° to 205° C.).

EXAMPLE 19

4-(N,N-dimethylamino)-4'-(2,4,6-triisopropylbenzenesulfonamido)diphenylamine (melting point 166° to 168° C.).

EXAMPLE 20

4-(N,N-dihexylamino)-2'-chloro-4'-(2,4,6-triisopropylbenzenesulfonamido)diphenylamine.

EXAMPLE 21

4-(N,N-dihexylamino)-2'-[δ-(2,4-di-t-amylphenoxy)butylcarbamoyl]-4'-(2,4,6-triisopropylbenzenesulfonamido)diphenylamine (melting point 151° to 152° C.).

EXAMPLE 22

4-(N,N-didodecylamino)-3'-methyl-4'-(2,4,6-triisopropylbenzenesulfonamido)diphenylamine, p-toluenesulfonic acid salt (melting point 172° to 174° C.).

EXAMPLE 23

4-[N-ethyl-N-(octanoylmethyl)amino]-3'-methyl-4'-(2,4,6-triisopropylbenzenesulfonamido)diphenylamine (melting point 86° to 88° C.).

EXAMPLE 24

4-(N,N-didodecylamino)-2'-[δ-(2,4-di-t-amylphenoxy)butyl sulfamyl]-4'-(2,4,6-triisopropylbenzenesulfonamido)diphenylamine, p-toluenesulfonic acid salt (melting point 154° to 155° C.).

EXAMPLE 25

4-Methoxy-2-methyl-2'-(4-decyl)benzamido-4'-(2,4,6-triisopropylbenzenesulfonamido)diphenylamine.

EXAMPLE 26

4-(N,N-dihexylamino)-2-phenylsulfonyl-4'-(2,4,6-triisopropylbenzenesulfonamido)diphenylamine (melting point 144° C.).

EXAMPLE 27

4-(N,N-diethylamino)-2-methyl-4'-(2,4,6-triisopropylbenzenesulfonamido)diphenylamine (melting point 158° to 159° C.).

EXAMPLE 28

4-(N,N-diethylamino)-2,3'-dimethyl-4'-(2,4,6-triisopropylbenzenesulfonamido)diphenylamine (melting point 152° to 154° C.).

EXAMPLE 29

4-[N-ethyl-N-(β-methoxyethyl)amino]-2-methyl-2'-[(4-morpholino)sulfamyl]-4'-(2,4,6-triisopropylbenzenesulfonamido)diphenylamine (melting point 168° to 169° C.).

EXAMPLE 30

4-(N,N-dimethylamino)-2-methyl-5-methoxy-4'-(2,4,6-triisopropylbenzenesulfonamido)diphenylamine.

EXAMPLE 31

4-(N,N-dimethylamino)-2-methyl-5-methoxy-2'-octanamido-4'-(2,4,6-triisopropylbenzenesulfonamido)diphenylamine (melting point 190° to 194° C.).

EXAMPLE 32

4-[N-ethyl-N-(β-methanesulfonamidoethyl)amino]-2-methyl-2'-pivalamido-4'-(2,4,6-triisopropylbenzenesulfonamido)diphenylamine (melting point 143° to 145° C.).

EXAMPLE 33

4-Hexyloxy-2'-(4-methoxyphenoxy)formamido-4'-(2,4,6-triisopropylbenzenesulfonamido)diphenylamine.

EXAMPLE 34

4-(N,N-dihexylamino)-3'-pivalamido-4'-(2,4,6-triisopropylbenzenesulfonamido)diphenylamine (melting point 146° to 148° C.).

EXAMPLE 35

4-[N-diethyl-N-(β-methoxyethyl)amino]-2-methyl-2'-octanamido-4'-(2,4,6-triisopropylbenzenesulfonamido)diphenylamine (melting point 137° to 138° C.).

EXAMPLE 36

4-Piperidino-2'-methoxy-5'-pivalamido-4'-(2,4,6-triisopropylbenzenesulfonamido)diphenylamine (melting point 209° to 210° C.).

EXAMPLE 37

4-Hexyloxy-2'-acetamido-4'-(2,4,6-triisopropylbenzenesulfonamido)diphenylamine.

EXAMPLE 38

4-[N-ethyl-N-(β-methanesulfonamidoethyl)amino]-2-methyl-2',5'-didodecyloxy-4'-((2,4,6-triisopropylbenzenesulfonamido)diphenylamine (melting point 75° to 78° C.).

EXAMPLE 39

4-(N,N-diethylamino)-2-methyl-2'-methoxy-5'-[α-(2,4-di-t-amylphenoxy)hexanamido]-4'-(2,4,6-triisopropylbenzenesulfonamido)diphenylamine (melting point 107° to 110° C.).

EXAMPLE 40

4-[N-ethyl-N-(β-methanesulfonamidoethyl)amino]-2-methyl-2',5'-dipivalamido-4'-(methanesulfonamido)diphenylamine.

EXAMPLE 41

4-[N-ethyl-N-(β-methanesulfonamidoethyl)amino]-2-methyl-2',5'-dipivalamido-4'-benzenesulfonamidodiphenylamine.

EXAMPLE 42

4-[N-ethyl-N-(β-methanesulfonamidoethyl)amino]-2-methyl-2',5'-dipivalamido-4'-(2,4,6-trimethylbenzenesulfonamido)diphenylamine.

EXAMPLE 43

4-Phenoxy-3'-methyl-4'-(2,4,6-triisopropylbenzenesulfonamido)diphenylamine (melting point 140° to 142° C.).

EXAMPLE 44

4-(2,6-Dimethylphenoxy)-3'-methyl-4'-(2,4,6-triisopropylbenzenesulfonamido)diphenylamine (melting point 210° C.).

EXAMPLE 45

4-(2,6-Diisopropylphenoxy)-3'-methyl-4'-(2,4,6-triisopropylbenzenesulfonamido)diphenylamine (melting point 124° to 126° C.).

EXAMPLE 46

4-[2,6-di(1-methylpropyl)phenoxy]-3'-methyl-4'-(2,4,6-triisopropylbenzenesulfonamido)diphenylamine (melting point 163° to 164° C.).

EXAMPLE 47

2,4-Dimethoxy-2'-[δ-(2,4-di-t-amylphenoxy)butylsulfamyl]-4'-(2,4,6-triisopropylbenzenesulfonamido)diphenylamine (melting point 139° to 140° C.).

EXAMPLE 48

4-Hexyloxy-2'-[δ-(2,4-di-t-amylphenoxy)butylcarbamoyl]-4'-(2,4,6-triisopropylbenzenesulfonamido)diphenylamine.

EXAMPLE 49

4-Hexyloxy-2'-methylsulfonyl-4'-(2,4,6-triisopropylbenzenesulfonamido)diphenylamine (melting point 136° to 138° C.).

EXAMPLE 50

4-Hexyloxy-2'-carboxy-4'-(2,4,6-triisopropylbenzenesulfonamido)diphenylamine (melting point 179° to 181° C.).

EXAMPLE 51

4-Hexyloxy-3'-ethoxycarbonyl-4'-(2,4,6-triisopropylbenzenesulfonamido)diphenylamine.

EXAMPLE 52

4-Hexyloxy-2'-(2-methyl)butanamido-4'-(2,4,6-triisopropylbenzenesulfonamido)diphenylamine.

EXAMPLE 53

4-Hexyloxy-3'-pivalamido-4'-(2,4,6-triisopropylbenzenesulfonamido)diphenylamine (melting point 120° to 122° C.).

EXAMPLE 54

4-Octyloxy-2'-pivalamido-4'-(2,4,6-triisopropylbenzenesulfonamido)diphenylamine (melting point 95° to 100° C.).

EXAMPLE 55

4-Methoxy-2-methyl-2'-pivalamido-4'-(2,4,6-triisopropylbenzenesulfonamido)diphenylamine.

EXAMPLE 56

4-Methoxy-2-methyl-2'-octanamido-4'-(2,4,6-triisopropylbenzenesulfonamido)diphenylamine (melting point 146° to 148° C.).

EXAMPLE 57

4-Methoxy-2-methyl-2'-n-hexylureido-4'-(2,4,6-triisopropylbenzenesulfonamido)diphenylamine (melting point 124° to 126° C.).

EXAMPLE 58

4-Hexyloxy-2'-[α-(2,4-di-t-amylphenoxy)hexanamido]-4'-(2,4,6-triisopropylbenzenesulfonamido)diphenylamine.

EXAMPLE 59

4-Hexyloxy-2'-(N-methyl)acetamido-4'-(2,4,6-triisopropylbenzenesulfonamido)diphenylamine (melting point 67° to 75° C.).

EXAMPLE 60

4-Hexyloxy-3-methoxy-4'-(2,4,6-triisopropylbenzenesulfonamido)diphenylamine (melting point 142° to 143° C.).

EXAMPLE 61

4-Hexyloxy-3'-methylsulfonyl-4'-(2,4,6-triisopropylbenzenesulfonamido)diphenylamine (melting point 118° C.).

EXAMPLE 62

4-Hexyloxy-3-methyl-4'-(4-hydroxyphenylsulfonamido)diphenylamine.

EXAMPLE 63

3-(4-dodecyloxyphenyl)sulfonamido-4'-(2,4,6-triisopropylbenzenesulfonamido)diphenylamine (melting point 154° to 155° C.).

EXAMPLE 64

3-(2,4-di-t-amylphenoxy)acetamido-4'-(2,4,6-triisopropylbenzenesulfonamido)diphenylamine (melting point 153° to 154° C.).

EXAMPLE 65

4-(2,4-di-t-amylphenoxy)acetamido-4'-(2,4,6-triisopropylbenzenesulfonamido)diphenylamine (melting point 182° to 183° C.).

EXAMPLE 66

4-n-Octylureido-4'-(2,4,6-triisopropylbenzenesulfonamido)diphenylamine (melting point 200° to 203° C.).

EXAMPLE 67

4,4'-Bis(2,4,6-triisopropylbenzenelsulfonamido)diphenylamine (melting point 211° to 212° C.).

EXAMPLE 68

4-Hexyloxy-2'-(2-ethyl)butanamido-4'-(2,4,6-triisopropylbenzenesulfonamido)diphenylamine.

EXAMPLE 69

4-Hexyloxy-2'-octanamido-4'-(2,4,6-triisopropylbenzenesulfonamido)diphenylamine.

EXAMPLE 70

4-(N,N-diethylamino)-4'-(4-n-dodecyloxybenzenesulfonamido)diphenylamine (melting point 171° to 172° C.).

EXAMPLE 71

4-(N,N-diethylamino)-4'-methanesulfonamidodiphenylamine (melting point 106° to 108° C.).

EXAMPLE 72

4-Hexyloxy-2'-(2-ethyl)hexanamido-4'-(2,4,6-triisopropylbenzenesulfonamido)diphenylamine.

EXAMPLE 73

4-(N,N-dihexylamino-4'-(2,4,6-trimethylbenzenesulfonamido)diphenylamine, p-toluenesulfonic acid salt (melting point 123° to 126° C.).

EXAMPLE 74

4-Hexyloxy-2'-cyclohexanecarboxamido-4'-(2,4,6-triisopropylbenzenesulfonamido)diphenylamine.

EXAMPLE 75

4-(N,N-dihexylamino)-3'-methyl-4'-benzenesulfonamidodiphenylamine (melting point 76° to 78° C.).

EXAMPLE 76

4-(N,N-dihexylamino)-3'-methyl-4'-(2,4,6-triisopropylbenzenesulfonamido)diphenylamine (melting point 81° to 82° C.).

EXAMPLE 77

4-(N,N-dihexylamino-2'-methylsulfonyl-4'-benzenesulfonamidodiphenylamine (melting point 141° C.).

EXAMPLE 78

4-(N,N-dihexylamino)-2'-methylsulfonyl-4'-(2,4,6-triisopropylbenzenesulfonamido)diphenylamine (melting point 115° to 116° C.).

EXAMPLE 79

4-(N,N-dihexylamino)-2'-(N,N-diethylsulfamyl)-4'-benzenesulfonamidodiphenylamine.

EXAMPLE 80

4-(N,N-dihexylamino)-3'-trifluoromethyl-4'-benzenesulfonamidodiphenylamine, p-toluenesulfonic acid salt (melting point 164° to 165° C.).

EXAMPLE 81

4-(N,N-dihexylamino)-2'-trifluoromethyl-4'-benzenesulfonamidodiphenylamine, p-toluenesulfonic acid salt (melting point 165° to 166° C.).

EXAMPLE 82

4-Hexyloxy-2'-hexadecanamido-4'-(2,4,6-triisopropylbenzenesulfonamido)diphenylamine.

EXAMPLE 83

4-Hexyloxy-2'-benzamido-4'-(2,4,6-triisopropylbenzenesulfonamido)diphenylamine.

EXAMPLE 84

4-Hexyloxy-4'-benzenesulfonamidodiphenylamine (melting point 119° to 120° C.).

EXAMPLE 85

4-Hexyloxy-4'-(2,4,6-triisopropylbenzenesulfonamido)diphenylamine (melting point 127° C.).

EXAMPLE 86

4-Hexyloxy-3'-methyl-4'-benzenesulfonamidodiphenylamine (melting point 129° to 131° C.).

EXAMPLE 87

4-Hexyloxy-2'-(4-n-pentyl)benzamido-4'-(2,4,6-triisopropylbenzenesulfonamido)diphenylamine.

EXAMPLE 88

4,4'-Ditolysulfonamidodiphenylamine.

EXAMPLE 89

4-[N-ethyl-N-($\beta$-methanesulfonamidoethyl)amino]-2-methyl-2'-octanamido-4'-benzenesulfonamidodiphenylamine.

EXAMPLE 90

4-[N-ethyl-N-($\beta$-methanesulfonamidoethyl)amino]-2-methyl-3'-pivalamido-4'-(2,4,6-triisopropylbenzenesulfonamido)diphenylamine.

EXAMPLE 91

4-{-N-ethyl-N-[$\beta$-methane(N-methylsulfonamido)ethyl]amino}-2-methyl-2'-octanamido-4'-(2,4,6-triisopropylbenzenesulfonamido)diphenylamine.

EXAMPLE 92

4-[N-ethyl-N-($\beta$-methanesulfonamidoethyl)amino]-2-methyl-2'-(3-octylsulfamyl)benzamido-4'-(2,4,6-triisopropylbenzenesulfonamido)diphenylamine (melting point 73° to 80° C.).

EXAMPLE 93

4-(N,N-dimethylamino)-3-methoxy-2-methyl-2'-methanesulfonyl-4'-(2,4,6-triisopropylbenzenesulfonamido)diphenylamine (melting point 110° to 113° C.).

EXAMPLE 94

[4-(N,N-diethylamino)-2-methylphenyl](4'-benzenesulfonamidonaphthyl)amine (melting point 213° to 216° C.).

EXAMPLE 95

[4-(N,N-diethylamino)-2-methylphenyl](2'-[$\alpha$-(2,4-di-t-amylphenoxy)hexanamido]-4'-benzenesulfonamidonaphthyl)amine (melting point 148° to 152° C.).

EXAMPLE 96

4-[N-ethyl-N-($\beta$-methanesulfonamidoethyl)amino]-2-methylphenyl(4'-benzenesulfonamidonaphthyl)amine (melting point 156° to 158° C.).

EXAMPLE 97

[4-[N-ethyl-N-($\beta$-methanesulfonamidoethyl)amino]-2-methylphenyl]-4'-(4-dodecyloxybenzenesulfonamidonaphthyl)amine (melting point 113° to 115° C.).

EXAMPLE 98

[4-[N-ethyl-N-($\beta$-methanesulfonamidoethyl)amino]-2-methylphenyl](2'-decanamido-4-benzenesulfonamidonaphthyl)amine.

EXAMPLE 99

4-[N-methyl-N-acetamido]amino-2'-octanamido-4'-(2,4,6-triisopropylbenzenesulfonamido)diphenylamine.

EXAMPLE 100

4-n-Octylureido-2'-octanamido-4'-(2,4,6-triisoprophylbenzenesulfonamido)diphenylamine (melting point 114° to 115° C).

EXAMPLE 101

1,4-Bis{N-4,4'-bis(2,4,6-triisopropylbenzenesulfonamido)-2,2'-bisoctanamido]}phenyl-phenylenediamine (melting point 185° to 186° C.).

EXAMPLE 102

4-Methoxy-2-methyl-2'-hexadecanamido-4'-(2,4,6-triisopropylbenzenesulfonamido)diphenylamine.

EXAMPLE 103

4-Methoxy-2-methyl-2'-[(3-acetoxy)propionamido]-4'-(2,4,6-triisopropylbenzenesulfonamido)diphenylamine (melting point 150° to 151° C.).

EXAMPLE 104

4-Methoxy-2-methyl-2'-[(3-carboxy)propionamido]-4'-(2,4,6-triisopropylbenezenesulfonamido)diphenylamine (melting point 174° C.).

EXAMPLE 105

4-Hexyloxy-2'-(4-n-decyl)benzamido-4'-(2,4,6-triisopropylbenzenesulfonamido)diphenylamine.

EXAMPLE 106

2,4-Dimethoxy-3'-methyl-4'-(2,4,6-triisopropylbenzenesulfonamido)diphenylamine (melting point 154° to 155° C.).

EXAMPLE 107

2,4-Dimethoxy-2'-octanamido-4'-(2,4,6-triisopropylbenzenesulfonamido)diphenylamine (melting point 133° to 135° C.).

EXAMPLE 108

4-Methoxy-3-methanesulfonamido-2'-octanamido-4'-(2,4,6-triisopropylbenzenesulfonamido)diphenylamine.

EXAMPLE 109

4-Methoxy-3-(N-methyl)methanesulfonamido-2'-octanamido-4'-(2,4,6-triisopropylbenzenesulfonamido)diphenylamine.

EXAMPLE 110

4-Methoxy-3-methanesulfonamido-2'-pivalamido-4'-(2,4,6-triisopropylbenzenesulfonamido)diphenylamine (melting point 165° to 167° C.).

EXAMPLE 111

3,4,5-Trimethoxy-2'-hexadecanamido-4'-(2,4,6-triisopropylbenzenesulfonamido)diphenylamine (melting point 110° to 112° C.).

EXAMPLE 112

4-Methoxy-3,5-dibromo-2',5'-dipivalamido-4'-(2,4,6-triisopropylbenzenesulfonamido)diphenylamine (melting point 186° to 187° C.).

EXAMPLE 113

4-Methoxy-3-bromo-2',5'-dipivalamido-4'-(2,4,6-triisopropylbenzenesulfonamido)diphenylamine (melting point 214° to 215° C.).

EXAMPLE 114

4-Methoxy-2',5'-dipivalamido-4'-(2,4,6-triisopropylbenzenesulfonamido)diphenylamine (melting point 201° to 202° C.).

EXAMPLE 115

4-Methoxy-3,5-dichloro-2',5'-dipivalamido-4'-(2,4,6-triisopropylbenzenesulfonamido)diphenylamine (melting point 186° to 187° C.).

EXAMPLE 116

4-Ethylcarbonylmethyleneoxy-2'-octanamido-4'-(2,4,6-triisopropylbenzenesulfonamido)diphenylamine (melting point 126° to 127° C.).

EXAMPLE 117

4-Carboxymethyleneoxy-2'-octanamido-4'-(2,4,6-triisopropylbenzenesulfonamido)diphenylamine (melting point 108° to 110° C.).

EXAMPLE 118

4-[N-$\beta$-(4-methoxybenzoyl)hydrazino]-2-octanamido-4'-(2,4,6-triisopropylbenzenesulfonamido)diphenylamine (melting point 166° to 168° C.).

EXAMPLE 119

4-Hexyloxy-2',5'-dipivalamido-4'-(2,4,6-triisopropylbenzenesulfonamido)diphenylamine.

EXAMPLE 120

4-Hexyloxy-3'-pivalamido-4'-(2,4,6-triisopropylbenzenesulfonamido)diphenylamine (melting point 120° to 122° C.).

EXAMPLE 121

4-Hexyloxy-2'-[$\alpha$-(2,4-di-tert-amylphenoxy)hexanamido]-4'-(2,4,6-triisopropylbenzenesulfonamido)diphenylamine.

EXAMPLE 122

4-Hexyloxy-2'-[$\alpha$-(3-tert-butyl-4-acetoxyphenyl)tetradecanamido]-4'-(2,4,6-triisopropylbenzenesulfonamido)diphenylamine.

EXAMPLE 123

4-Hexyloxy-2'-[$\alpha$-(3-tert-butyl-4-hydroxyphenyl)tetradecanamido]-4'-(2,4,6-triisopropylbenzenesulfonamido)diphenylamine.

EXAMPLE 124

4-Hexyloxy-2'-(3-octylsulfamyl)benzamido-4'-(2,4,6-triisopropylbenzenesulfonamido)diphenylamine (melting point 65° to 75° c.).

EXAMPLE 125

4-Hexyloxy-2'-[3-(N-methyl)octylsulfamyl]benzamido-4'-(2,4,6-triisopropylbenzenesulfonamido)diphenylamine.

EXAMPLE 126

4-Hexyloxy-2'-(3-ethoxycarbonylmethylenesulfamyl)benzamido-4'-(2,4,6-triisopropylbenzenesulfonamido)diphenylamine (melting point 90° to 93° C.).

EXAMPLE 127

4-Hexyloxy-2'-methyl-6'-octanamido-4'-(2,4,6-triisopropylbenzenesulfonamido)diphenylamine (melting point approximately 45° C.).

EXAMPLE 128

3,5-Bis{N-[2-(N-hexyloxyphenyl)amino-5-(2,4,6-triisopropylbenzenesulfonamido)]phenylcarbamoyl-}isoamylphenoxybenzene (melting point 82° to 87° C.).

EXAMPLE 129

4-Hexyloxy-3'-chloro-4'-(2,4,6-triisopropylbenzenesulfonamido)diphenylamine (melting point 143° to 144° C.).

EXAMPLE 130

[4'-(2,4,6-Triisopropylbenzenesulfonamido)naphthyl](4-n-hexyloxyphenyl)amine (melting point 161° to 162° C.).

EXAMPLE 131

[4'-(4-Dodecyloxyphenylsulfonamido)naphthyl](4-n-hexyloxyphenyl)amine (melting point 101° to 102° C.).

EXAMPLE 132

(2'-Octanamido-4'-benzenesulfonamidonaphthyl)(4-n-hexyloxyphenyl)amine (melting point 142° to 144° C.).

EXAMPLE 133

4-Hexyloxy-3'-methyl-5'-phenylsulfonyl-4'-(2,4,6-triisopropylbenzenesulfonamido)diphenylamine (melting point 167° to 168° C.).

EXAMPLE 134

4-Hexyloxy-2',3'-dimethanesulfonyl-4'-(2,4,6-triisopropylbenzenesulfonamido)diphenylamine (melting point 152° to 153° C.).

EXAMPLE 135

4-Hexyloxy-2'-(4-methoxy)benzamido-4'-(2,4,6-triisopropylbenzenesulfonamido)diphenylamine.

EXAMPLE 136

3-(N-methyl)methanesulfonamido-2'-octanamido-4'-(2,4,6-triisopropylbenzenesulfonamido)diphenylamine.

EXAMPLE 137

3-(N-methyl)methanesulfonamido-2'-hexadecanamido-4'-(2,4,6-triisopropylbenzenesulfonamido)diphenylamine (melting point 110° to 118° C.).

EXAMPLE 138

3-Methanesulfonamido-4-methyl-2'-hexadecanamido-4'-(2,4,6-triisopropylbenzenesulfonamido)diphenylamine (melting point 63° to 67° C.).

EXAMPLE 139

2,4-Dimethyl-5-methanesulfonamido-2'-hexadecanamido-4'-(2,4,6-triisopropylbenzenesulfonamido)diphenylamine (melting point 63° to 68° C.).

EXAMPLE 140

2-Methoxy-5-methanesulfonamido-2'-octanamido-4'-(2,4,6-triisopropylbenzenesulfonamido)diphenylamine.

EXAMPLE 141

3-Methanesulfonamido-2',5'-dipivalamido-4'-(2,4,6-triisopropylbenzenesulfonamido)diphenylamine.

EXAMPLE 142

3-Acetamido-2'-octanamido-4'-(2,4,6-triisopropylbenzenesulfonamido)diphenylamine (melting point 75° to 83° C.).

EXAMPLE 143

4-[N-ethyl-N-($\beta$-methanesulfonamidoethyl)amino]-2-methyl-4'-(2,4,6-triisopropylbenzenesulfonamido)diphenylamine.

EXAMPLE 144

4-Hexyloxy-2'-(4-chlorobenzamido)-4'-(2,4,6-triisopropylbenzenesulfonamido)diphenylamine.

EXAMPLE 145

4-Hexyloxy-2'-(4-cyanobenzamido)-4'-(2,4,6-triisopropylbenzenesulfonamido)diphenylamine.

EXAMPLE 146

4-Hexyloxy-2'-(n-t-butyl)ureido-4'-(2,4,6-triisopropylbenzenesulfonamido)diphenylamine.

EXAMPLE 147

4-Hexyloxy-2'-(n-octyl)ureido-4'-(2,4,6-triisopropylbenzenesulfonamido)diphenylamine.

EXAMPLE 148

4-Hexyloxy-2'-(n-octadecyl)ureido-4'-(2,4,6-triisopropylbenzenesulfonamido)diphenylamine.

EXAMPLE 149

4-Hexyloxy-2'-cyclohexylureido-4'-(2,4,6-triisopropylbenzenesulfonamido)diphenylamine.

EXAMPLE 150

4-Hexyloxy-2'-phenylureido-4'-(2,4,6-triisopropylbenzenesulfonamido)diphenylamine.

EXAMPLE 151

4-Hexyloxy-2'-(4-methylphenyl)ureido-4'-(2,4,6-triisopropylbenzenesulfonamido)diphenylamine.

EXAMPLE 152

4-Hexyloxy-2'-(4-methoxyphenyl)ureido-4-(2,4,6-triisopropylbenzenesulfonamido)diphenylamine.

EXAMPLE 153

4-Hexyloxy-2'-(4-chlorophenyl)ureido-4'-(2,4,6-triisopropylbenzenesulfonamido)diphenylamine.

EXAMPLE 154

4-Hexyloxy-2'-(4-cyanophenyl)ureido-4'-(2,4,6-triisopropylbenzenesulfonamido)diphenylamine.

EXAMPLE 155

4-Hexyloxy-2'-(N-butoxycarbonyl)amino-4'-(2,4,6-triisopropylbenzenesulfonamido)diphenylamine.

EXAMPLE 156

4-Hexyloxy-2'-(N-octyloxycarbonyl)amino-4'-(2,4,6-triisopropylbenzenesulfonamido)diphenylamine.

EXAMPLE 157

4-Hexyloxy-2'-(N-phenoxycarbonyl)amino-4'-(2,4,6-triisopropylbenzenesulfonamido)diphenylamine.

The above color-forming para-sulfonamidodiphenylamine dye precursors are useful for forming sulfonimide dyes in imaging materials as described in copending U.S. application Ser. No. 280,626, now abandoned, of R. S. Gabrielsen, P. A. Graham, J. E. Klijanowicz and M. H. Stern, filed July 6, 1981 and entitled "Color-Forming Para-Sulfonamidodiphenylamine Dye Precursor and Sulfonimide Dye in Photographic Material and Process", the disclosure of which is incorporated herein by reference.

The invention has been described in detail with particular reference to preferred embodiments thereof, but it will be understood that variations and modifications can be effected within the spirit and scope of the invention.

What is claimed is:

1. A color-forming sulfonamidodiphenylamine which is represented by the formula:

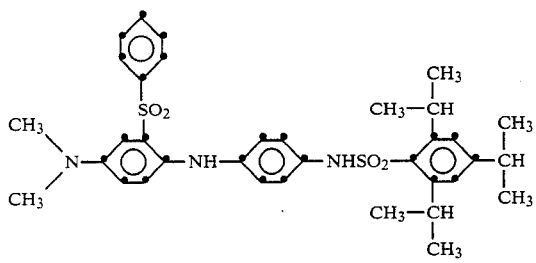

2. A color-forming para-sulfonamidodiphenylamine represented by the formula:

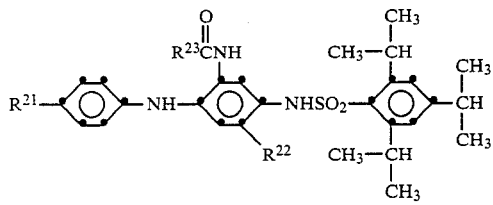

wherein:

$R^{21}$ is alkoxy containing 1 to 20 carbon atoms or

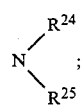

$R^{22}$ is hydrogen or

$R^{23}$ is alkyl containing 1 to 20 carbon atoms, aryl containing 6 to 12 carbon atoms, alkoxy containing 1 to 4 carbon atoms, aryloxy containing 6 to 12 carbon atoms or NH—$R^{27}$;

$R^{24}$ is hydrogen or alkyl containing 1 to 20 carbon atoms;

$R^{25}$ is hydrogen, alkyl containing 1 to 20 carbon atoms, or aryl containing 6 to 15 carbon atoms;

$R^{26}$ is alkyl containing 1 to 20 carbon atoms, cycloalkyl containing 5 to 20 carbon atoms, or aryl containing 6 to 12 carbon atoms, alkoxy containing 1 to 4 carbon atoms, aryloxy containing 6 to 12 carbon atoms or NH—$R^{28}$;

$R^{27}$ is alkyl containing 1 to 20 carbon atoms, aryl containing 6 to 12 carbon atoms, alkoxy containing 1 to 4 carbon atoms, or aryloxy containing 6 to 12 carbon atoms; and $R^{28}$ is alkyl containing 1 to 20 carbon atoms, aryl containing 6 to 12 carbon atoms, alkoxy containing 1 to 4 carbon atoms, or aryloxy containing 6 to 12 carbon atoms.

3. A color-forming para-sulfonamidodiphenylamine as in claim 2 which is represented by the formula:

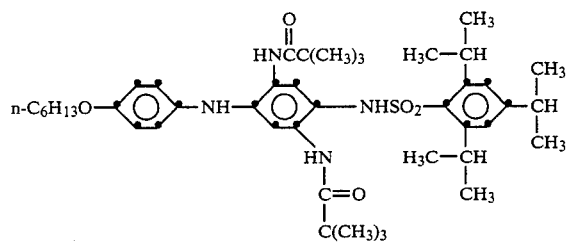

4. A sulfonimide dye which is represented by the formula:

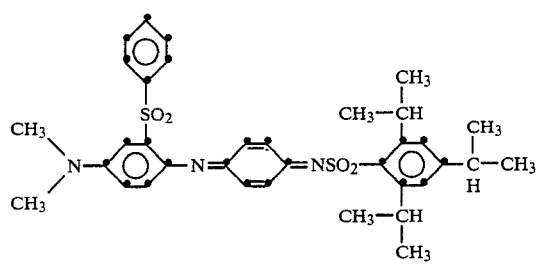

5. A sulfonimide dye represented by the structure:

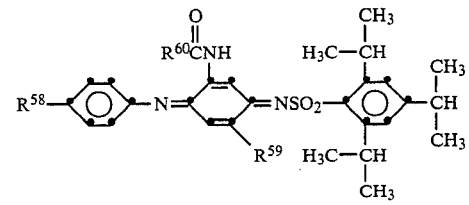

wherein:

$R^{58}$ is alkoxy containing 1 to 20 carbon atoms or

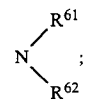

$R^{59}$ is hydrogen or

R[60] is alkyl containing 1 to 20 carbon atoms, aryl containing 6 to 12 carbon atoms, alkoxy containing 1 to 4 carbon atoms, aryloxy containing 6 to 12 carbon atoms or NH—R[64];

R[61] is hydrogen or alkyl containing 1 to 20 carbon atoms;

R[62] is hydrogen, alkyl containing 1 to 20 carbon atoms, or aryl containing 6 to 15 carbon atoms;

R[63] is alkyl containing 1 to 20 carbon atoms, cycloalkyl containing 5 to 20 carbon atoms, or aryl containing 6 to 12 carbon atoms, alkoxy containing 1 to 4 carbon atoms, aryloxy containing 6 to 12 carbon atoms or NH—R[65];

R[64] is alkyl containing 1 to 20 carbon atoms, aryl containing 6 to 12 carbon atoms, alkoxy containing 1 to 4 carbon atoms, aryloxy containing 6 to 12 carbon atoms; and R[65] is alkyl containing 1 to 20 carbon atoms, aryl containing 6 to 12 carbon atoms, alkoxy containing 1 to 4 carbon atoms or aryloxy containing 6 to 12 carbon atoms.

6. A sulfonimide dye which is represented by the structure:

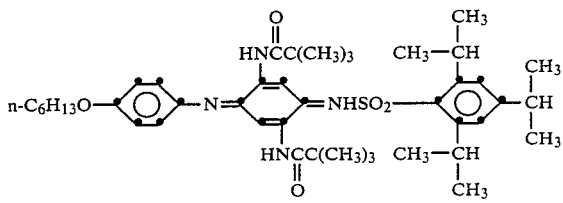

* * * * *